United States Patent
Pozgay et al.

(10) Patent No.: US 8,033,307 B2
(45) Date of Patent: Oct. 11, 2011

(54) MODULAR ROUTER WITH BASE POWER SWITCH

(75) Inventors: David Pozgay, Evanston, IL (US);
James B. Stevens, Oak Park, IL (US);
Harald Krondorfer, Aurora, OH (US);
Jeff Schreiner, Milwaukee, WI (US);
Martin Feldman, Mundelein, IL (US);
Tim Truesdale, Lindenhurst, IL (US);
Arturo Gonzalez, Mexicali (MX);
Deborah Brown, Evanston, IL (US);
Erick Higashi, Mexicali (MX); Charlie Ren, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 12/371,559

(22) Filed: Feb. 13, 2009

(65) Prior Publication Data
US 2010/0206430 A1    Aug. 19, 2010

(51) Int. Cl.
*B27C 5/10* (2006.01)
(52) U.S. Cl. ............... 144/136.95; 144/154.5; 409/182; 409/206; 409/218
(58) Field of Classification Search ............. 144/136.95, 144/154.5; 409/182, 206, 209, 210, 214, 409/218
See application file for complete search history.

(56) References Cited

U.S. PATENT DOCUMENTS

| | | | |
|---|---|---|---|
| 3,533,119 A | 10/1970 | Dokos | |
| 4,187,046 A * | 2/1980 | Atherton | 409/180 |
| 4,461,330 A * | 7/1984 | Judkins | 144/154.5 |
| 5,033,552 A | 7/1991 | Hu | |
| 5,207,253 A | 5/1993 | Hoshino et al. | |
| 5,273,089 A | 12/1993 | Fuchs et al. | |
| 5,310,296 A | 5/1994 | McCurry | |
| 5,998,897 A * | 12/1999 | Bosten et al. | 310/89 |
| 6,726,414 B2 * | 4/2004 | Pientka et al. | 409/182 |
| 6,986,369 B1 * | 1/2006 | Cooper et al. | 144/136.95 |
| 7,052,382 B2 | 5/2006 | Baker | |
| 7,490,642 B1 | 2/2009 | Cooper et al. | |
| 7,578,325 B2 | 8/2009 | Freese et al. | |
| 7,921,889 B2 * | 4/2011 | Pozgay et al. | 144/391 |
| 7,931,054 B2 * | 4/2011 | Pozgay et al. | 144/136.95 |
| 2003/0188441 A1 | 10/2003 | Patton | |
| 2006/0147286 A1 | 7/2006 | Cooper et al. | |
| 2010/0206429 A1 * | 8/2010 | Pozgay et al. | 144/136.95 |
| 2010/0206431 A1 * | 8/2010 | Pozgay et al. | 144/136.95 |
| 2010/0206432 A1 * | 8/2010 | Pozgay et al. | 144/136.95 |
| 2010/0206433 A1 * | 8/2010 | Pozgay et al. | 144/136.95 |
| 2010/0206434 A1 * | 8/2010 | Pozgay et al. | 144/136.95 |

OTHER PUBLICATIONS

Tom Begnal, Router Combo Kits, Fine Woodworking (Nov./Dec. 2004), pp. 50-55.
Robert Bosch Tool Corporation, Operating/Safety Instructions for Router Model No. 1613AEVS (Oct. 2003), pp. 1-15.

* cited by examiner

*Primary Examiner* — Shelley Self
(74) *Attorney, Agent, or Firm* — Maginot, Moore & Beck

(57) ABSTRACT

A routing machine comprises a base unit and a motor unit releasably connected to the base unit. The base unit includes a handle and a first electrical connector. The motor unit includes an electric motor, motor control circuitry configured to energize or de-energize the electric motor, and a second electrical connector connected to the motor control circuitry. The second electrical connector is configured to engage the first electrical connector when the motor unit is properly seated on the base unit. An electric switch is positioned on the base unit. The motor control circuitry is configured to deliver electric power to the electric motor when the switch is in an on position. The motor control circuitry is configured to not provide electric power to the electric motor when the switch is in an off position.

20 Claims, 32 Drawing Sheets

MODULAR ROUTER WITH BASE POWER SWITCH

FIELD OF THE INVENTION

Cross Reference is made to copending U.S. patent application Ser. No. 12/371,555, entitled "Modular Router with Base Sensor" by Pozgay et al., filed on Feb. 13, 2009.

The present invention relates to routers and more particularly to routers having interchangeable base units.

BACKGROUND OF THE INVENTION

Routers are used to remove material from a workpiece for decorative or functional purposes. In particular, routers may be useful in performing cabinetwork, cutting grooves in the surface or edges of a material, and applying a decorative border to a material through fluting or beading. In general, there are two types of routers, namely fixed base routers and plunge base routers. Both types of routers include an electric motor having a rotating shaft mounted vertically within a housing. The motor shaft terminates with a chuck, clamp, or collet for interchangeably securing a cutting tool, referred to as a router bit, to the shaft for rotation with the shaft. Fixed base routers and plunge base routers exhibit structural differences that affect the method by which the routers are operated.

Fixed base routers include a motor unit coupled to a base having a motor mount, two opposing handles, and a work engaging surface. The motor mount is connected to the top of the work engaging surface. The handles are connected to the motor mount and/or the top surface of the work engaging surface. A router bit, coupled to the motor unit, is configured to extend through an opening in the work engaging surface. The amount the router bit extends from the work engaging surface is adjustable depending on the position of the motor unit relative to the motor mount. In particular, the motor mount may include a plurality of different positions in which the motor unit may be locked. The plurality of positions enables a user to make grooves or cuts of a particular depth, depending on which position is selected. In general, a user operates a fixed base router by precisely guiding the rotating router bit around the edges or surface of a workpiece, thereby causing the bit to cut and remove portions of the workpiece at a fixed and predetermined depth.

Plunge base routers include a carriage, two opposing handles, a base plate, and two plunge posts. The plunge posts extend perpendicularly from the base plate and extend into channels formed in the carriage. The carriage is configured to house an electric motor, wherein the rotating shaft of the electric motor extends downward from the carriage toward the base plate. The opposing handles are connected to opposite sides of the carriage. Biasing members are configured to bias the carriage in an upward direction away from the base plate so that the motor shaft and the router bit, if one is attached, are positioned above the base plate, out of contact with a workpiece. A user may apply downward pressure upon the opposing handles, to slide the carriage down the plunge posts toward the workpiece until the router bit extends below the base plate by a predetermined distance. Thus, the term "plunge" refers to the ability of a plunge base router to direct a router bit into contact with a workpiece from the upper position in which the router maintains the rotating router bit above the workpiece, to the lower position in which the router bit is forced into contact with the workpiece. Upon releasing the downward pressure on the handles, the biasing system forces the carriage to slide up the plunge posts to the upper position, thereby removing the router bit from contact with the workpiece.

Some routers, referred to as modular or combination routers, are configured to have a motor unit that may be removably connected to a carriage upon a plunge base or a motor mount upon a fixed base. Combination routers offer users increased functionality; however, some combination routers are inconvenient to operate. For instance, past combination routers have included a motor power switch located upon the exterior of the motor unit. Thus, there exists the possibility that the motor could become energized without being connected to either the plunge base or the fixed base.

Furthermore, some users may find it inconvenient to energize and deenergize a combination router having a power switch located upon the motor unit. For instance, consider that in order to energize a combination router having a power switch upon the motor unit, a user must position the router near the workpiece, grasp one of the opposing handles with a first hand, actuate the power switch with a second hand, and then grasp the other opposing handle with the second hand. Such a process inconveniences users, because the torque generated by the motor may undesirably reposition the router before the user is able to grasp both handles, thereby impacting the precision of the cut or groove to be made.

In view of the foregoing, it would be advantageous to provide a combination router having a motor unit that does not become energized unless properly connected to a router base. It would be further advantageous to provide a combination router having a motor unit that may be energized and deenergized without requiring a user to release one of the router handles. Thus, an improved combination router and motor power switch are possible.

SUMMARY OF THE INVENTION

A routing machine comprises a base unit and a motor unit releasably seated on the base unit. The base unit includes a handle and a first electrical connector. The motor unit includes an electric motor, motor control circuitry configured to energize or de-energize the electric motor, and a second electrical connector connected to the motor control circuitry. The second electrical connector is configured to engage the first electrical connector when the motor unit is properly seated on the base unit. An electric switch is positioned on the base unit. The motor control circuitry is configured to deliver electric power to the electric motor when the switch is in an on position. The motor control circuitry is configured to not provide electric power to the electric motor when the switch is in an off position.

In at least one embodiment, the electric switch is positioned on the handle of the base unit. In another embodiment, the routing machine includes a lock on the handle configured to lock the electric switch in the on position. In yet another embodiment, the routing machine comprises a sensor configured to determine if the electric switch is in the on position or the off position when the motor unit is initially connected to the base unit. The router is configured to prevent delivery of electrical power to the electric motor if the electric switch is in the on position when the motor unit is initially connected to the base unit.

The above described features and advantages, as well as others, will become more readily apparent to those of ordinary skill in the art by reference to the following detailed description and accompanying drawings. While it would be desirable to provide a routing machine that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

DETAILED DESCRIPTION

Figure 1:
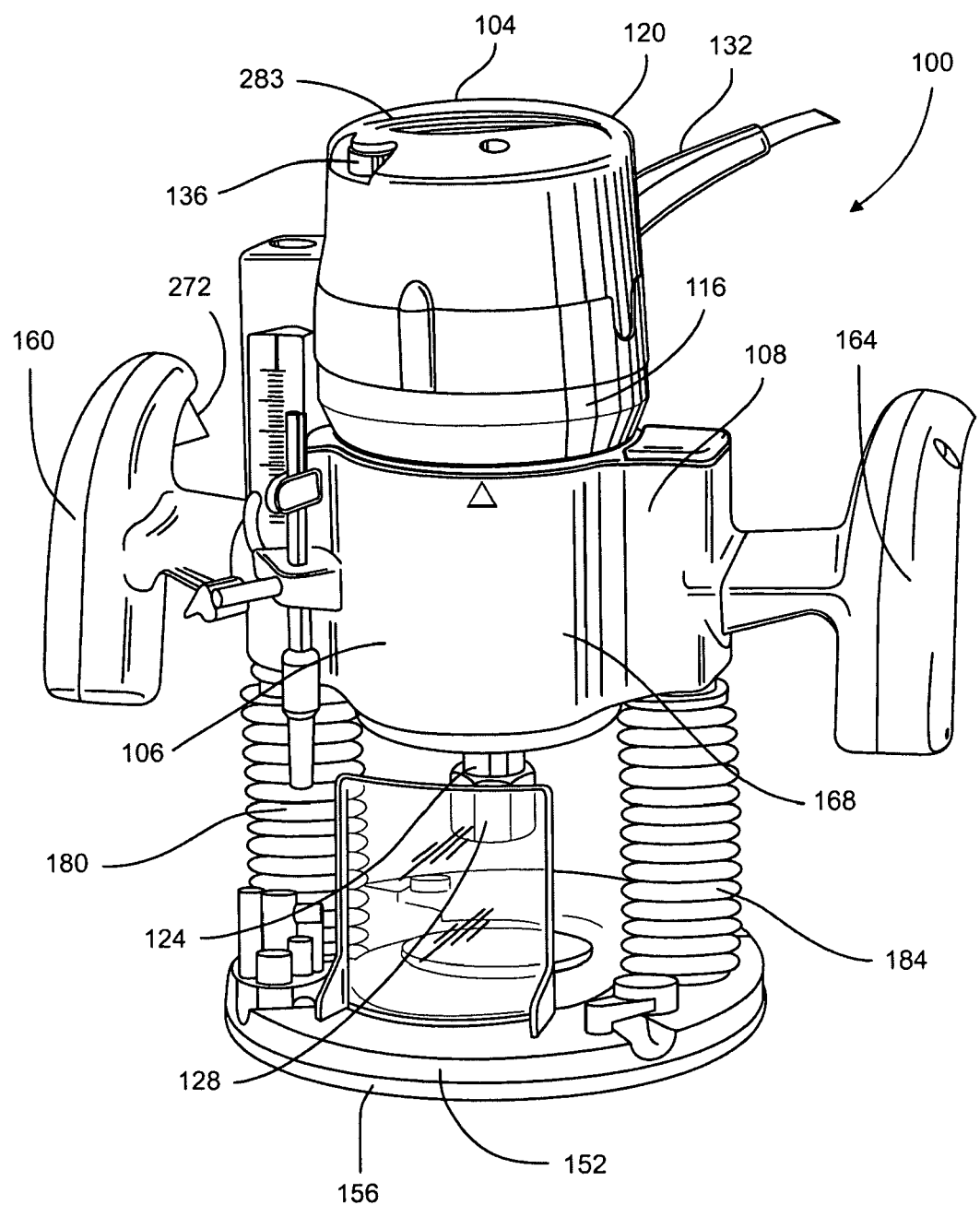
FIG. 1 illustrates a perspective view of a combination router having a motor unit coupled to a plunge base unit.
Figure 2:
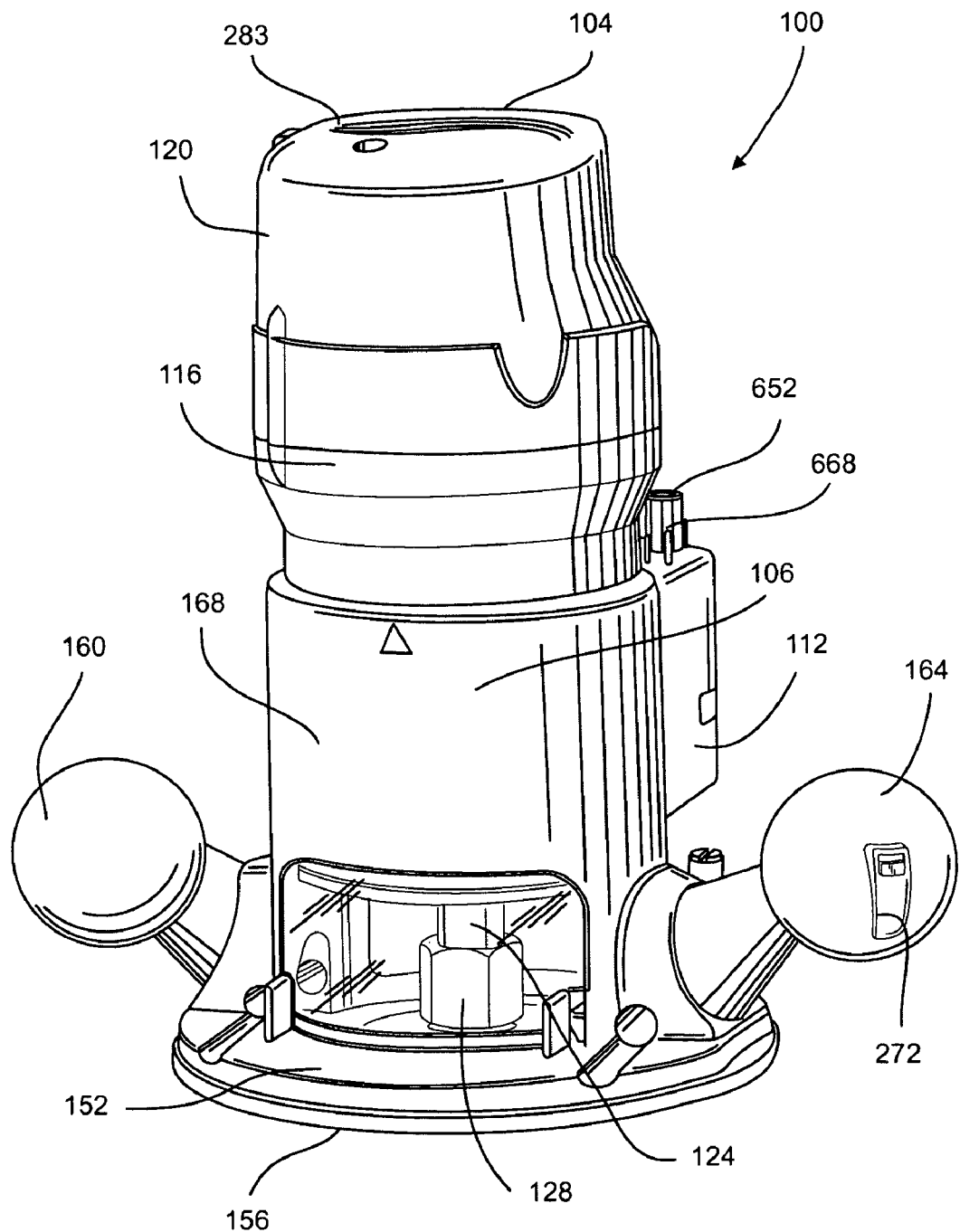
FIG. 2 illustrates a perspective view of the motor unit of FIG. 1 coupled to a standard base unit.

Referring to FIG. 1 and FIG. 2, a power tool is provided as a routing machine, in the form of a combination or modular router 100. The router 100 includes a motor unit 104 releasably connected to a base unit 106. In particular, the motor unit 104 may be connected to a plunge base unit 108, as illustrated in FIG. 1, or the motor unit 104 may be connected to a fixed or standard base unit 112, as illustrated in FIG. 2. The router 100 is configured to operate only when the motor unit 104 is properly secured to a base unit 106. As explained in detail below, the modular router 100 provides a motor clamp, a release latch, a standard base unit 112, a plunge base unit 108, a sleeve bearing, an offset fine adjustment mechanism, a base unit 106 and a motor unit 104 electrical connector, a power switch provided on the handle of the base unit 106, base sensing electronic circuitry, and fault protection electronic circuitry.

The Motor Unit

Figure 3:
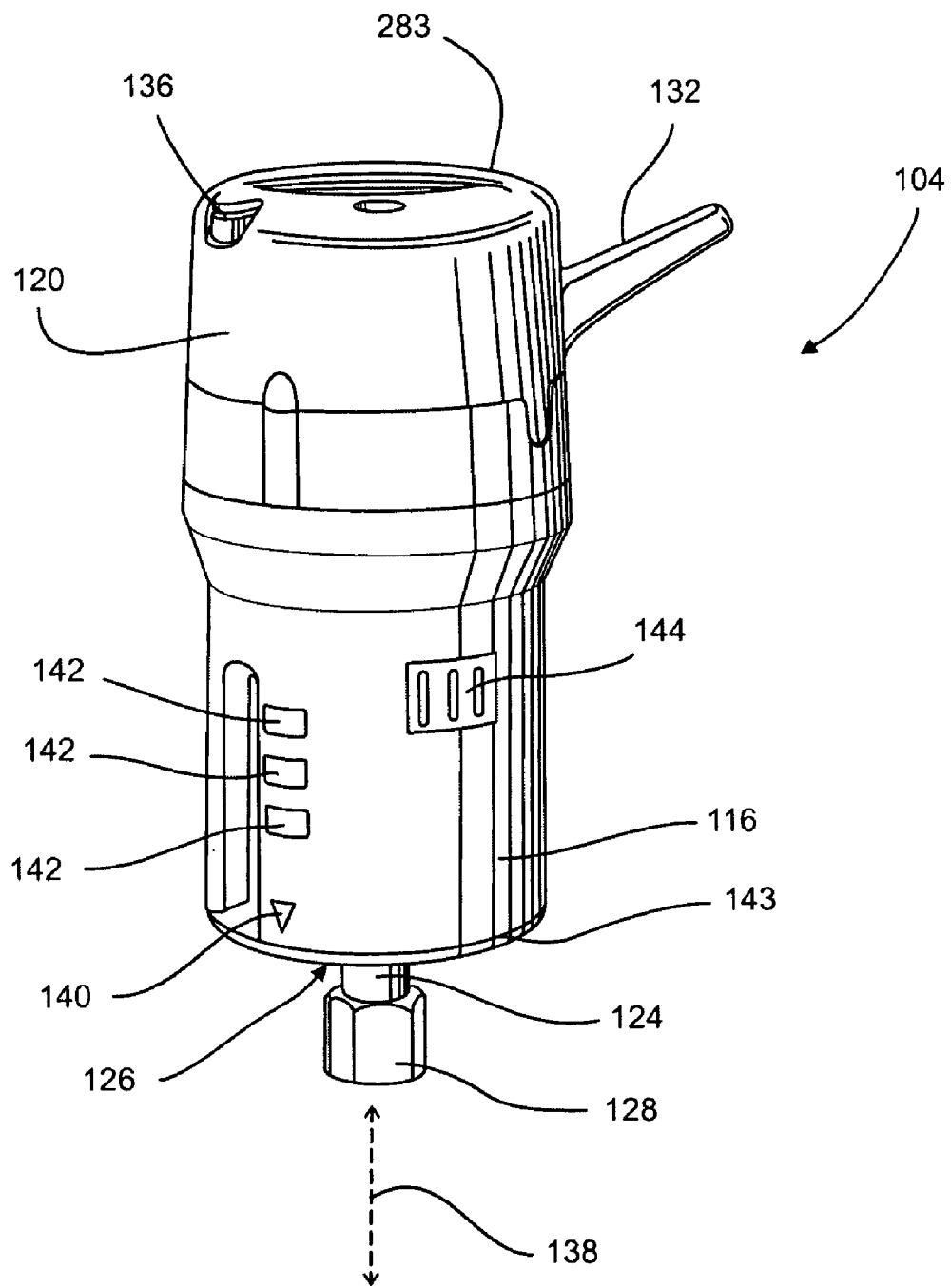
FIG. 3 illustrates a perspective view of a motor unit for use with the plunge base unit of FIG. 1 and the standard base unit of FIG. 2.
Figure 4:
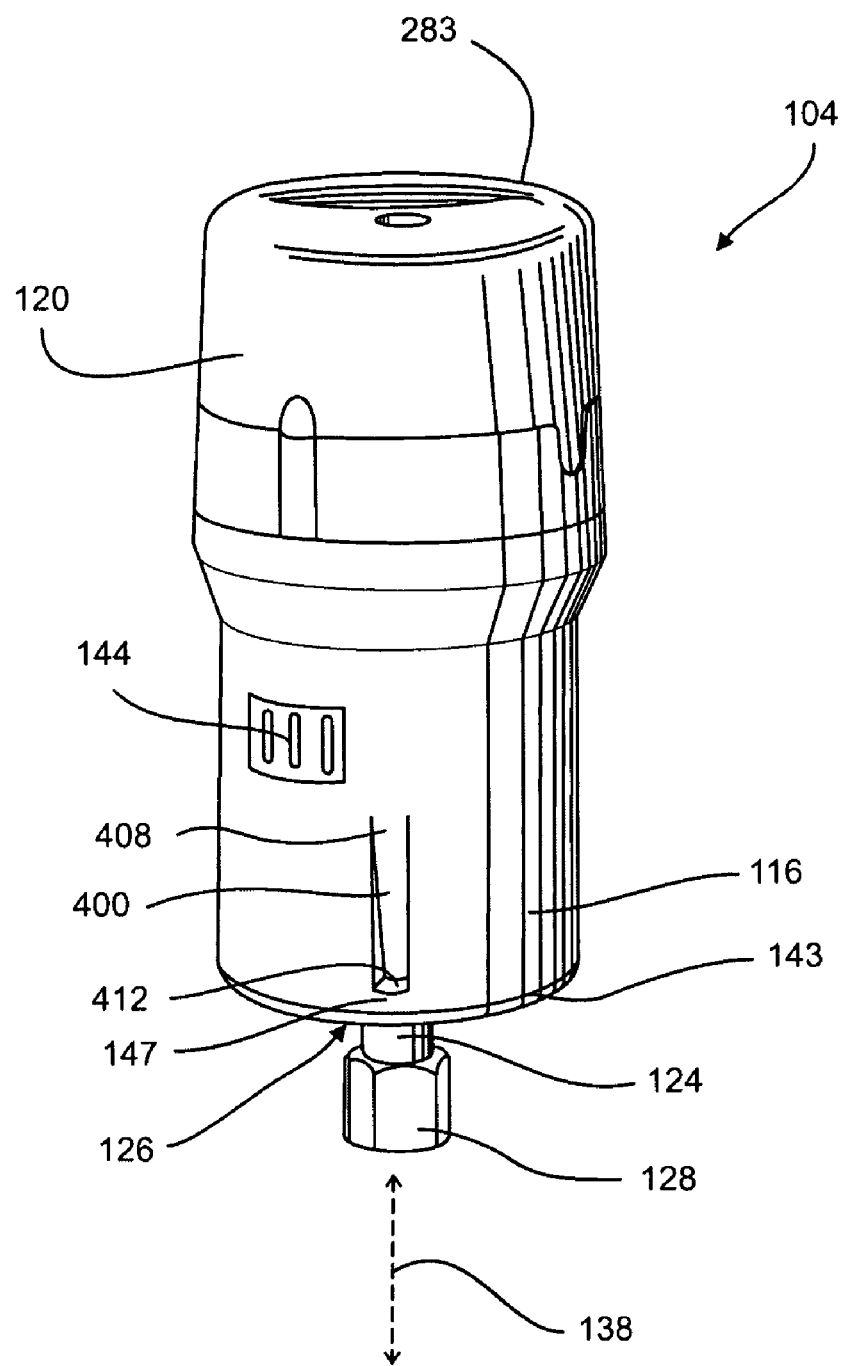
FIG. 4 illustrates a perspective view of a motor unit for use with the plunge base unit of FIG. 1 and the standard base unit of FIG. 2.

With reference to FIG. 3 and FIG. 4, the motor unit 104 is configured to be inserted into the mouth 146 of a base unit 106. In particular, the motor unit 104 defines a motor axis as represented by line 138 of FIG. 3 and FIG. 4. The motor unit 104 may be inserted into the mouth 146 of a base unit 106 generally in the direction of a motor axis 138. The motor unit 104 includes an electric motor 282 (not shown in FIG. 3 and FIG. 4, but illustrated schematically in FIG. 25), a lower connection portion 116, and an upper cover portion 120. The electric motor 282 is enclosed within the connection portion 116 and the cover portion 120. An exemplary motor 282 may be configured to rotate anywhere from 1000 to 40,000 rpm and have a power output of 1 to 3 kW. A drive shaft 124 of the motor 282 is configured to extend through an opening 126 in the bottom of the connection portion 116. The drive shaft 124 may be terminated with a collet or chuck 128 for removably coupling a router bit to the drive shaft 124; however, any sort of mechanism may be utilized to non-rotatably secure a router bit to the drive shaft 124.

The cover portion 120 of the motor unit 104 is coupled to the top of the connection portion 116. Together, the cover portion 120 and the connection portion 116 provide a housing for the motor 282, with the motor housing having an upper surface 283. The cover portion 120 may be constructed of any rigid material such as plastic, metal, or composite materials such as a fiber-reinforced polymer. Openings for a power cord 132 and a motor speed adjustment dial 136 may be formed in the cover portion 120, as illustrated in FIG. 3.

Figure 5:
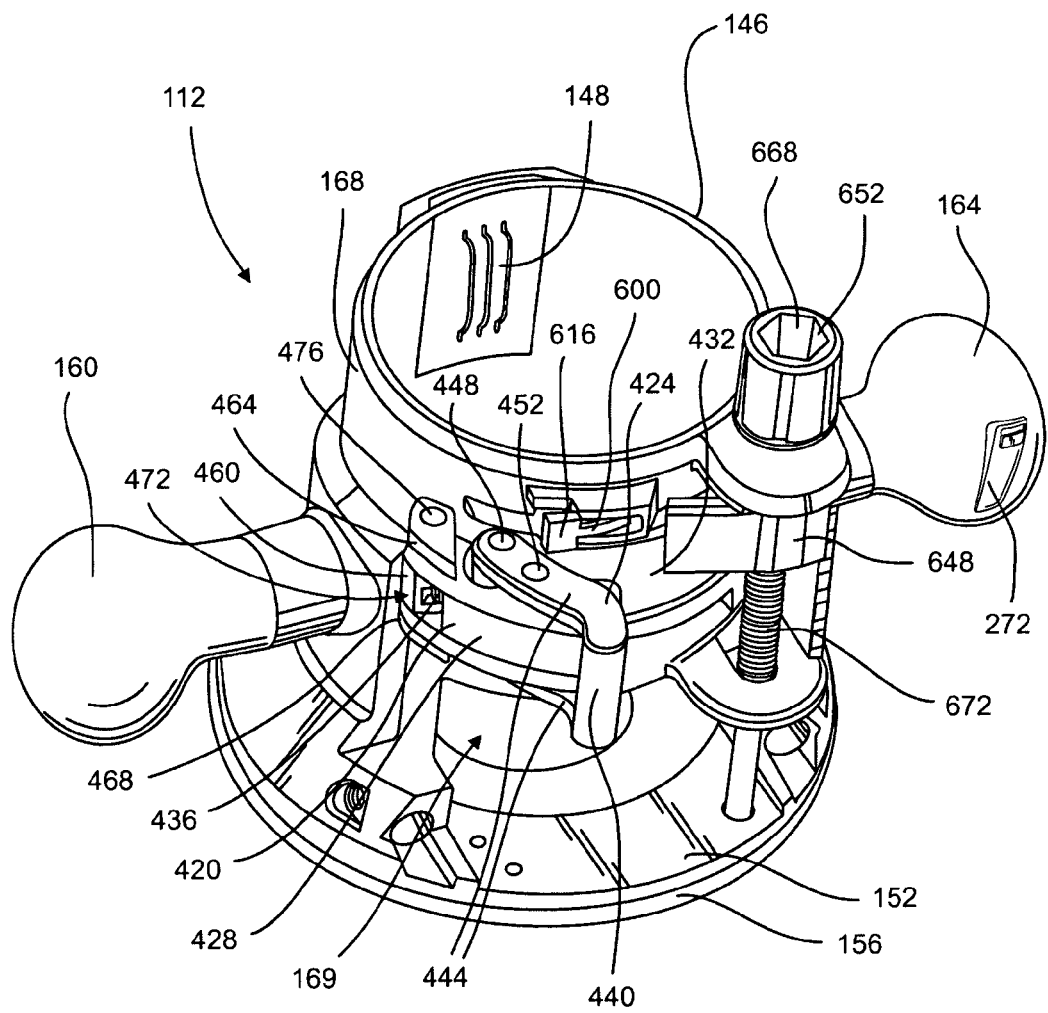
FIG. 5 illustrates a perspective view of a standard base unit for use with the motor unit of FIG. 3 and FIG. 4.
Figure 6:
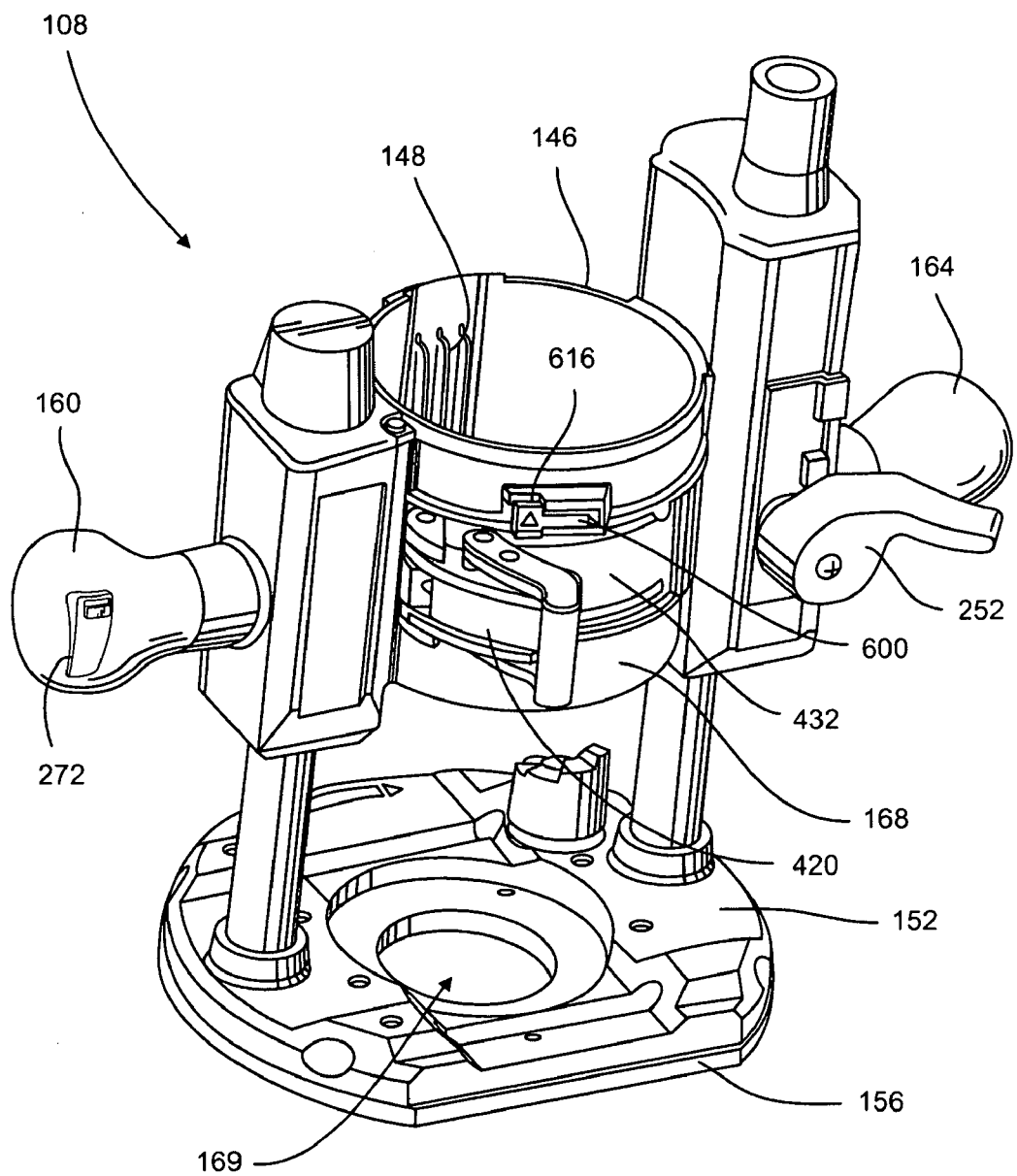
FIG. 6 illustrates a perspective view of a plunge base unit for use with the motor unit of FIG. 3 and FIG. 4.

Referring still to FIG. 3 and FIG. 4, the connection portion 116 of the motor unit 104 has an exterior periphery designed to be inserted into a similarly shaped opening or mouth 146 (as shown in FIG. 5 and FIG. 6) in a base unit 106 (see, e.g., FIG. 1 and FIG. 2). The connection portion 116 may be constructed of rigid materials including, but not limited to, aluminum, magnesium, steel, and metallic alloys that are light and resistant to wear. Although the illustrated motor unit 104 is generally cylindrical, the exterior periphery of connection portion 116 may take any of various shapes, so long as the base unit 106 includes a corresponding mouth 146 configured to engage the connection portion 116. A surface feature such as arrow 140 on the motor unit 104 is aligned with a similar surface feature on the base unit 106 when the motor unit 104 is properly aligned for insertion into the base unit 106.

Figure 10:
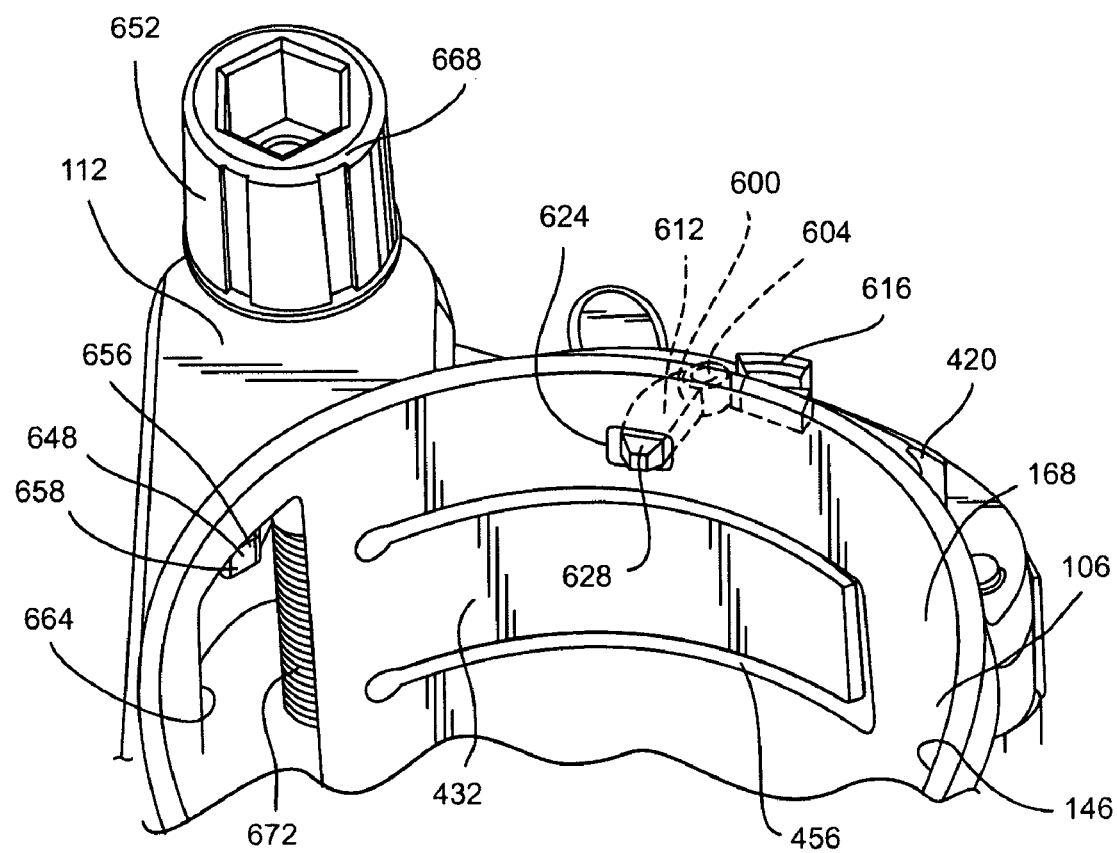
FIG. 10 illustrates a perspective view of the release latch of FIG. 5 and FIG. 6.
Figure 11:
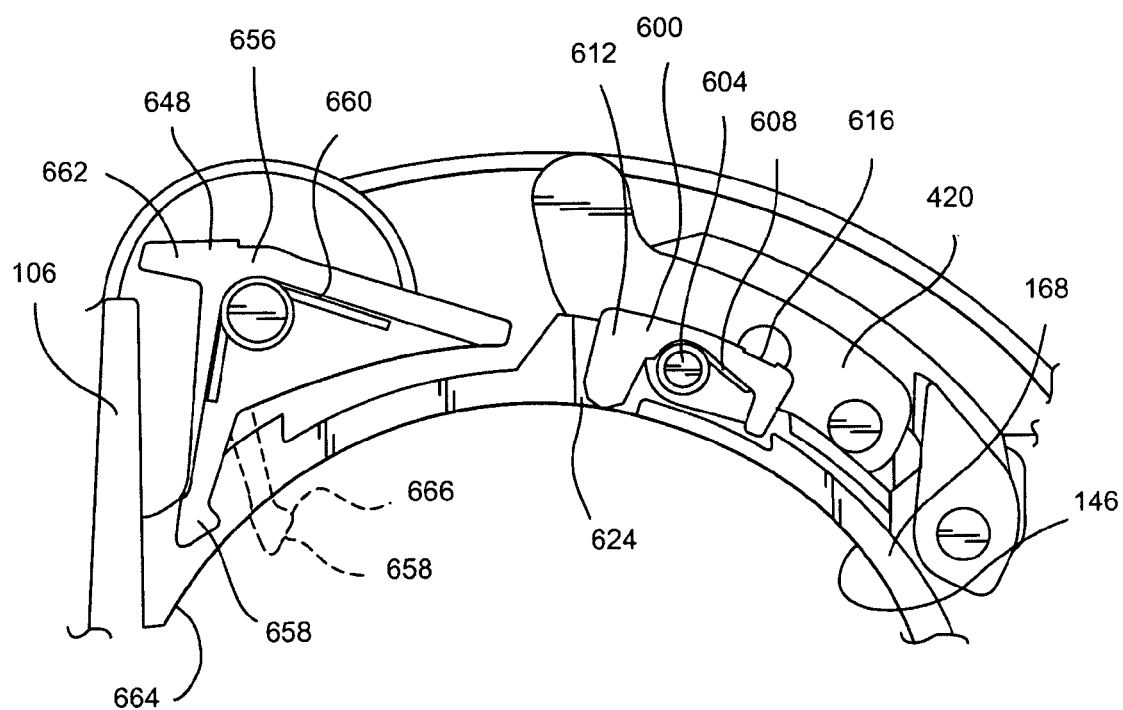
FIG. 11 illustrates plan view of the release latch of FIG. 10.

As illustrated in FIG. 3 and FIG. 4, the connection portion 116 may include a series of slots provided as notches 142, a chamfered lower rim 143, and an elongated tapered groove 400 (as shown in FIG. 4). The series of notches 142 are configured to engage a motor depth adjustment latch 656 (as shown in FIG. 10 and FIG. 11) upon the standard base unit 112. The notches 142 are arranged upon the connection portion 116 substantially parallel to the motor axis 138. The vertical position of the connection portion 116 relative the base unit 112 is variable, depending on the notch 142 to which the depth adjustment latch 656 is engaged. Positioning the depth adjustment latch 656 in a notch 142 closer to the top of connection portion 116 results in the router bit extending farther from the base unit 112, thereby making a deeper cut. Likewise, positioning the detent 658 in a notch 142 closer to the bottom of the connection portion 116 results in the router bit extending less from the base unit 112, thereby making a shallower cut.

The chamfered lower rim 143, illustrated most clearly in FIG. 4, enables the motor unit 104 to be easily inserted into the mouth 146 in the base unit 106. In particular, the smaller diameter of the chamfered rim 143, as compared to the remainder of the connection portion 116, enables the chamfered rim 143 to be easily inserted into the mouth 146. Furthermore, as the chamfered rim 143 contacts the side of the mouth 146, the chamfered surface slide upon the rim of the mouth 146, thereby centering the connection portion 116 within the mouth 146. An exemplary degree of the chamfer may range anywhere from 20 degrees to 80 degrees. Furthermore, as described in further detail below, the chamfered rim 143 may be configured to displace a finger 612 upon a release latch 600 (as most clearly shown in FIG. 10) as the motor unit 104 is inserted into the base unit 106.

Referring still to FIG. 4, the elongated tapered groove 400 extends in an axial direction along the outer surface of the connection portion 116, substantially parallel to the motor axis 138. The tapered groove 400 begins just above the chamfered rim 143. Specifically, a gap 147 separates the tapered groove 400 from the chamfered rim 143. The diameter of the connection portion 116 at the gap 147 and at the diameter of the connection portion 116 above the tapered groove 400 are approximately equal as demonstrated by dashed line 404 of FIG. 12 and FIG. 13. The width of the tapered groove 400 is configured to be slightly wider than the width of the finger 612, as described below.

Figure 12:
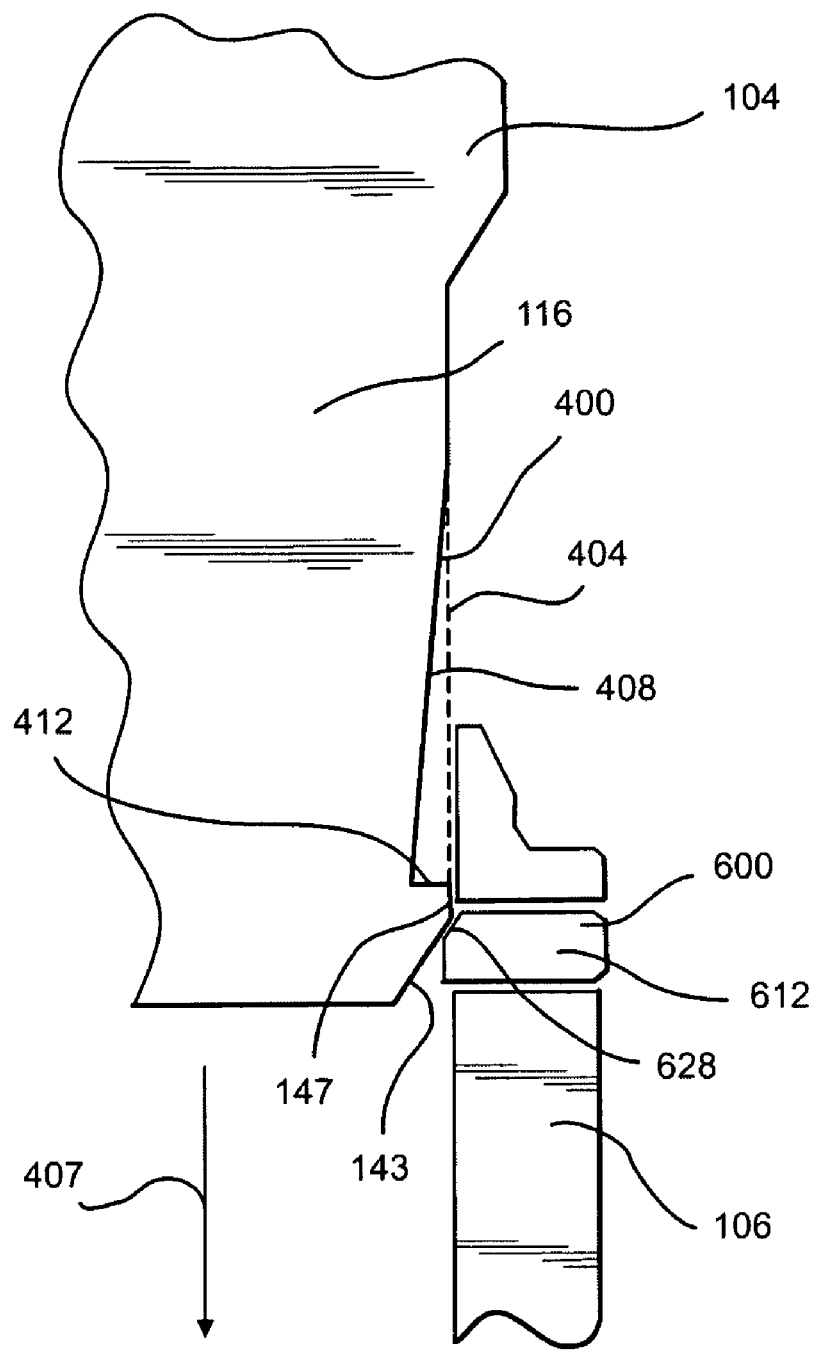
FIG. 12 illustrates a cutaway elevational view of the release latch of FIG. 10 and the motor unit of FIG. 4.
Figure 13:
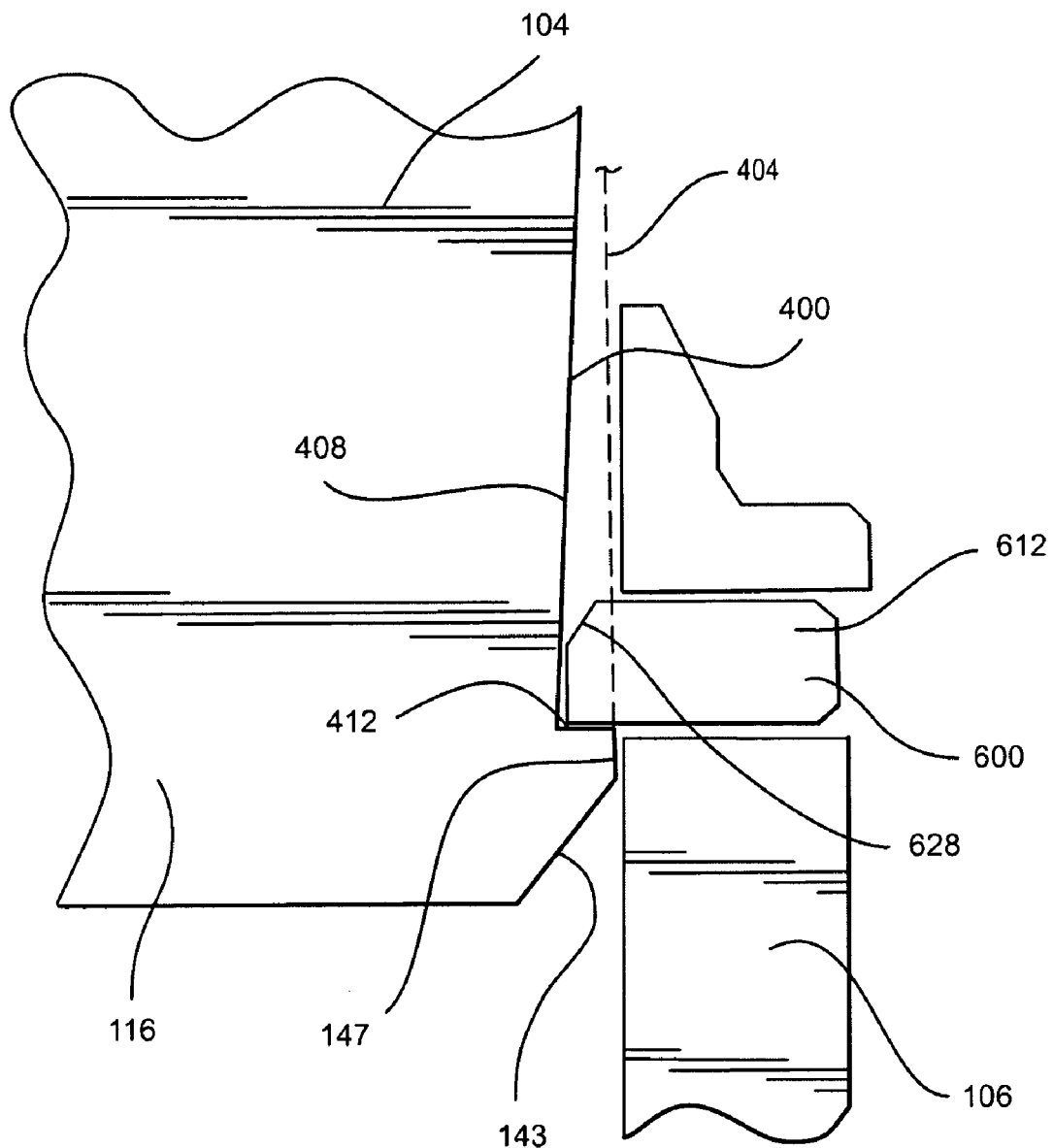
FIG. 13 illustrates a cutaway elevational view of the release latch of FIG. 10 and the motor unit of FIG. 4.

The tapered groove 400 includes an inclined surface 408 and a shoulder 412, as illustrated in FIGS. 4, 12, and 13. The top of the inclined surface 408 coincides with the exterior of the connection portion 116. However, the bottom of the inclined surface 408 extends 2 to 10 millimeters below the exterior surface of the connection portion 116. The shoulder 412 forms the lower boundary of the tapered groove 400. The width of the shoulder 412 is approximately equal to the width of the tapered groove 400. The depth of the shoulder 412 is determined by the distance the inclined surface 408 extends below the exterior surface of the connection portion 116. As illustrated in FIG. 12 and FIG. 13, an approximately 90 degree angle is formed by the shoulder 412 on the exterior surface of the connection portion 116. The shoulder 412 abuts the finger 612 of the release latch 600 when the motor unit 104 is drawn upward from the base unit 106 in order to maintain the motor unit 104 in the base unit 106, as explained in further detail below.

Figure 4A:
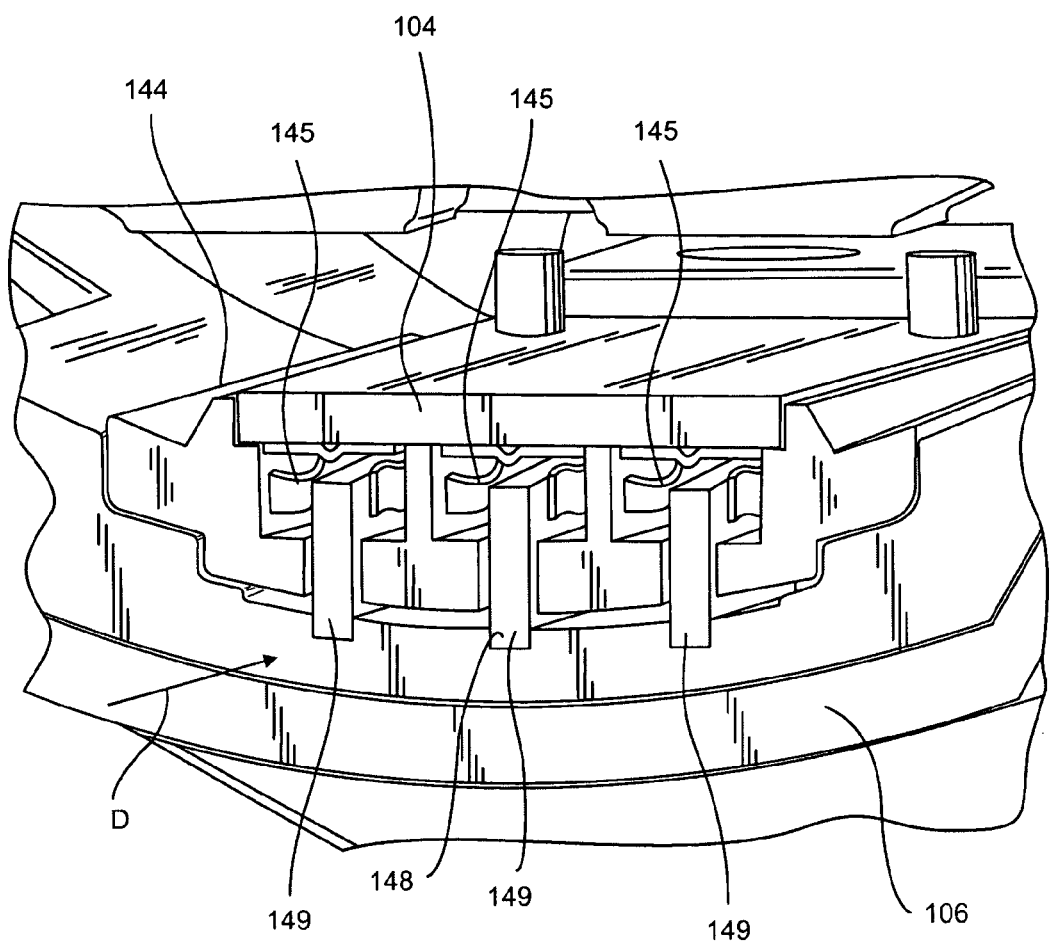
FIG. 4A illustrates a perspective view of an electrical connector for use with the motor unit of FIG. 3 and FIG. 4.

As illustrated in FIGS. 3, 4, and 4A, the connection portion 116 of the motor unit 104 includes an electrical connector 144. As illustrated best in FIG. 4A, the electrical connector 144 may be formed of a plurality of receptacles 145 supported by an insulating material. For example, the electrical connector 144 may have three receptacles 145. As explained below, each receptacle 145 is configured to receive a blade 149 extending from a corresponding electrical connector 148 of the base unit 106. The receptacles 145 are configured to receive the blades 149 as the motor unit is inserted into the base unit in the direction of arrow D in FIG. 4A. Although one embodiment of electrical connector is shown in FIGS. 3 and 4, it will be recognized that the motor unit 104 may function with any type of electrical connector 144, capable of reliably making electrical contact with the corresponding electrical connector 148 on the base unit 106 in a potentially dusty environment. As illustrated in FIG. 3 and FIG. 4, the electrical connector 144 is secured to the exterior surface of the connection portion 116; however, the electrical connector 144 may be located in any position upon the motor unit 104 capable contacting the corresponding electrical connector 148 on the base unit 106. Thus, when the motor unit 104 is properly inserted in the base unit 106 in the direction of arrow D, the electrical connector 144 becomes electrically coupled to the complimentary electrical connector 148 in the base unit 106, such that an electrical connection is established between the motor unit 104 and the base unit 106.

The Base Unit

FIG. 5 shows an exemplary standard base unit 112 and FIG. 6 shows an exemplary plunge base unit 108. Although each base unit 106 is used for a different purpose, the base units 106 share many common components. For example, referring to FIG. 5 and FIG. 6, each base unit 106 includes a base plate 152, a work contact surface 156, two opposing handles 160, 164, a carriage 168, and an electrical connector 148. The base plate 152 is provided as a circular disc configured to support the router 100. However, in other embodiments, the base plate 152 may take on other forms, such as a square shape or any other closed figure. Furthermore, the base plate 152 is not necessarily flat and may include various surface irregularities. A work contact surface 156 is provided on the bottom of the base plate 152. The contact surface 156 is configured to slide smoothly upon a workpiece; accordingly, the contact surface 156 is generally flat and free of abrasions or other irregularities. Both the base plate 152 and the contact surface 156 include an opening 169 through which a router bit may project. The opposing handles 160, 164 are described below with reference to each base unit 106 individually.

The carriage 168 is connected to the top of the base plate 152; however, the method of attachment depends upon the type of base unit 106, as explained below. The carriage 168 includes a mouth 146 and a motor clamp 420. The mouth 146 has interior dimensions slightly larger than the exterior dimensions of the connection portion 116 of the motor unit 104. Although the illustrated mouth 146 is circular, the mouth 146 may be any shape as required by the exterior dimensions of the connection portion 116.

The Motor Clamp

As illustrated in FIGS. 5-8, a motor clamp 420 is provided on the base unit 106 and is configured to apply a clamping or compressive force upon the outer surface of the motor unit 104 to secure the motor unit 104 within the carriage 168 of the base unit 106. As explained below, the motor clamp 420 utilizes the principle of a four bar linkage configured for clamping in an "over center" orientation.

Referring now to FIG. 5, the motor clamp 420 includes a handle 424, an arm 428, a rigid flap 432 (best illustrated in FIG. 10), and a clamp adjustment mechanism 436. A plurality of pivots provided as axles 448, 452, 476 are also included on the motor clamp 420. The motor clamp 420 may be formed from materials including aluminum, magnesium, or metallic alloys that are light and durable. The motor clamp 420 is pivotable between an open position (see FIG. 7) and a closed position (see FIG. 8). In the open position, the motor unit 104 may be rotated and vertically translated within the mouth 146. In the closed position, the motor clamp 420 grips and clamps the connection portion 116 to prevent the motor unit 104 from rotating or vertically translating within the mouth 146.

Referring still to FIG. 5, the handle 424 includes a vertical grip portion 440 and two horizontal legs 444. The handle 424 is pivotally connected to the arm 428 and the rigid flap 432. Specifically, the flap 432 is connected to the horizontal legs 444 with axle 448, and the arm 428 is connected to the horizontal arms with axle 452. The handle 424 itself is configured to pivot about axle 448.

As best seen in FIG. 10, the flap 432 is defined by a channel 456 that extends through the carriage 168 along three sides of the flap 432. The channel 456 allows the flap 432 to flex and pivot about the side of the flap 432 that remains integral with the remainder of the carriage 168. In at least one embodiment, the interior surface of the flap 432 may be coated with a material having a comparatively high coefficient of friction, such that when the motor clamp 420 is closed, the motor unit 104 does not vertically translate or rotate relative the carriage 168.

Referring again to FIG. 5, the arm 428 is configured to pivot about axle 476. A tab 460 on the exterior surface of the carriage 168 retains the axle 476. The end of the arm 428 through which axle 476 extends includes an upper portion 464 and lower portion 468 separated by a void 472. The tab 460 projects from the exterior of the carriage 168 and has a height slightly less than the height of the void 472, such that the arm 428 may be connected to the carriage 168 with the tab 460 filling the void. The tab 460 may be integral with the carriage 168 and may be formed from the same material as the carriage 168 including, but not limited to, aluminum, steel, stainless steel and other metals or metallic alloys. As the handle 424 is pivoted above axle 448, the arm 428 pivots about axle 476 and axle 452.

Figure 7:
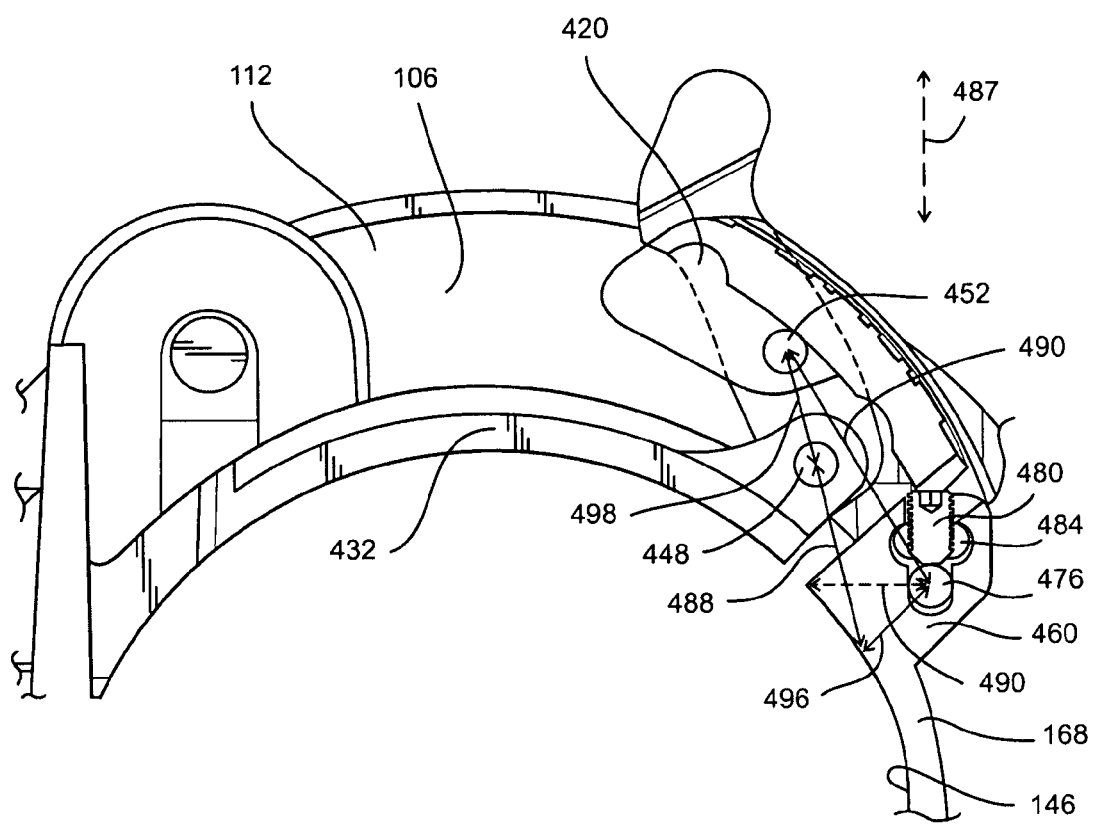
FIG. 7 illustrates a plan view of the motor latch of FIG. 5 and FIG. 6.
Figure 8:
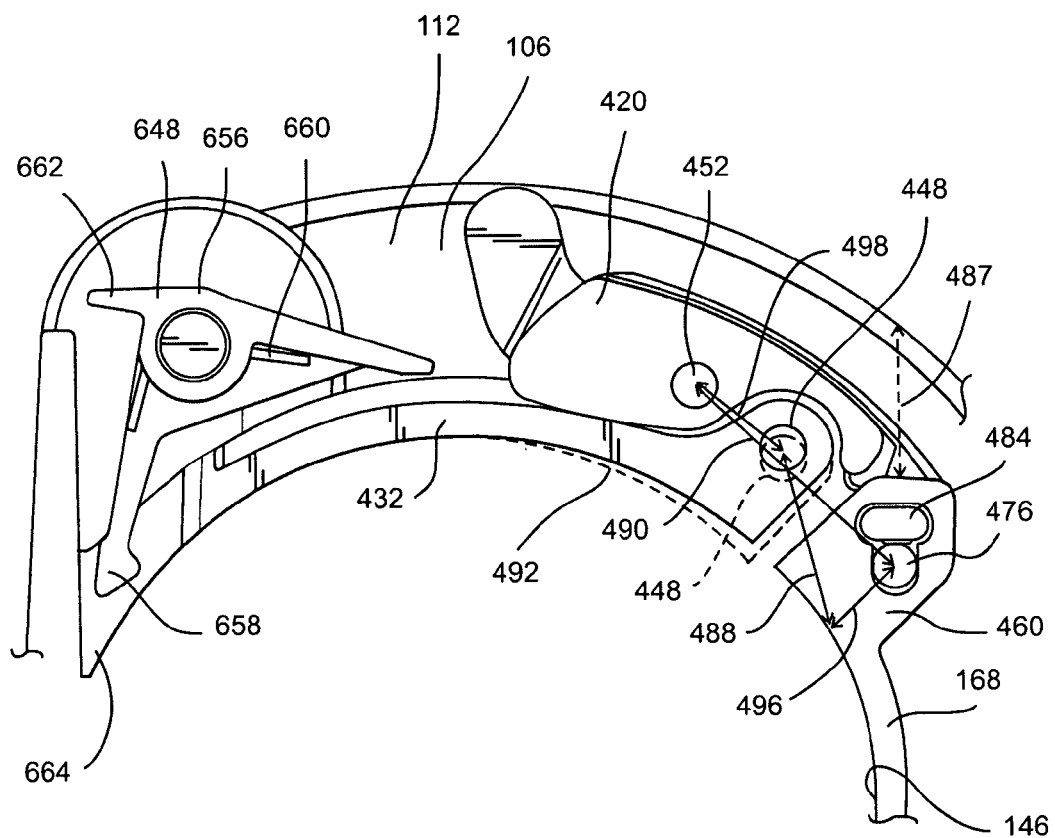
FIG. 8 illustrates a plan view of the motor latch of FIG. 5 and FIG. 6.

The clamp adjustment mechanism 436 determines the magnitude of the compressive force applied to the motor unit 104 when the motor clamp 420 is closed, as illustrated in FIGS. 5, 7, and 8. The adjustment mechanism 436 includes a set screw, provided as a threaded bolt 480, and a nut 484. The nut 484 may be formed of materials including, but not limited to, steel, stainless steel, and other hard and rigid metals or metallic alloys. As shown best in FIG. 7 and FIG. 8, the nut 484 is inserted into an axial channel formed in the tab 460. The axial channel extends downward from the top surface of the tab 460, but does not extend completely through the tab 460. The axial channel may closely surround the nut 484, such that the nut 484 may not rotate within the channel. In particular, the interior dimensions of the axial channel may match the exterior dimensions of the nut 484, so that the nut 484 does not rotate when a bolt 480 is threaded therein.

Referring to FIG. 7 and FIG. 8, the bolt 480 is configured to be threaded into the nut 484 through a lateral channel in tab 460. The bolt 480 may be formed of materials including, but not limited to steel, stainless steel, and other hard and rigid metals and metallic alloys. The lateral channel is approximately perpendicular to the axial channel and is represented by line 487. The dimensions of the lateral channel are equal or only slightly larger than the dimensions of the bolt 480, such that the bolt 480 may be threaded into the lateral channel. Additionally, the width of the lateral channel is just slightly larger than the diameter or width of axle 476, in order to permit the axle 476 to translate within the lateral channel in the direction represented by line 487 of FIG. 7 and FIG. 8. In some embodiments, access to the bolt 480 of the clamp adjustment mechanism 436 may be blocked when the motor clamp 420 is in the open position, such that the clamp adjustment member 436 cannot be adjusted when the motor clamp 420 is in the open position.

In operation, the motor clamp 420 is configured to secure the motor unit 104 to the carriage 168 of the base unit 106. As mentioned above, the motor clamp 420 utilizes the principles of a four bar linkage. Specifically, a first link (represented by line 496 of FIG. 7 and FIG. 8) extends from the interior surface of the carriage 168 to axle 476. A second link (represented by line 490 of FIG. 7 and FIG. 8) extends from axle 476 to axle 452. A third link (represented by line 498 in FIG. 7 and FIG. 8) extends from axle 452 to axle 448 and joins the handle 424 to the flap 432. A fourth link (represented by line 488 in FIG. 7 and FIG. 8) extends between the flap 432 and the tab 460. The fourth link 488 may be described as a theoretical link, because it is not represented by a mechanical element. Interaction of the links 488, 490, 496, 498, in the closed and opened position is explained below.

Referring to FIG. 7 and FIG. 8, the motor clamp 420 is illustrated attached to the standard base 112 and the plunge base 108. For explanation purposes, a motor unit 104 is not illustrated in either FIG. 7 or FIG. 8. As shown in FIG. 7, the motor clamp 420 is in the open position and a motor unit 104 is not inserted into the carriage 168. The motor clamp 420 may be closed by forcing the handle 440 toward the carriage 168 by pivoting the handle 440 about axle 448. As the handle 440 is pivoted, a force is exerted upon axle 448 that causes the flap 432 to pivot radially toward the center of the mouth 146, as illustrated by dashed line 492 of FIG. 8. In particular, as the handle 440 nears the carriage 168 a point at which the clamp 420 exerts a maximum force upon the flap 432 is reached. This point is referred to as the center point of the four bar linkage. By continuing to pivot the handle 440 beyond the center point to the "over center" position, as shown in FIG. 8, the force exerted upon the flap 432 is reduced. When the clamp 420 is closed, the four bar linkage remains beyond the center point as is evidenced by link 488 overlapping link 490. By positioning the handle 440 in a position beyond the center point, the clamp 420 delivers a constant and predictable force upon the flap 432 and also becomes "locked" in the closed position, such that a radially outward directed force from within the carriage 168 does not cause the clamp 420 to open.

To open the motor clamp 420, the handle 440 may be grasped and pivoted away from the carriage 168 about axle 448. As the handle 440 is initially pivoted, an increasing force is developed upon the flap 432 until the center point is reached. Once the center point is reached and exceeded, the handle 440 may be easily pivoted to a fully opened position, as shown in FIG. 7.

Although FIG. 7 and FIG. 8 do not show a motor unit 104, it will be recognized that when a motor unit 104 is inserted into the carriage 168 the mechanics of the clamp 420 operate similarly to the operation discussed in the above paragraphs; however, the connection portion 116 of the motor unit 104 prevents the flap 432 from extending toward the center of the carriage 168. In particular, the exterior dimensions of the motor unit 104 are only marginally smaller than the interior dimensions of the carriage 168, causing the motor unit 104 to fit easily, but snugly within the carriage 168. Accordingly, there exists only a very small gap between the flap 432 and the motor unit 104 when the motor clamp 420 is in the open position. When the handle 440 is pivoted to the closed position the developed force closes the very small gap; however, there then exists no further distance for the flap 432 to extend toward the center of the carriage 168. Instead, the previously radially directed force toward the center of the mouth 146 becomes a tangentially directed force due to the circular shape of the motor unit 104 and the flap 432. Thus, as the clamp 420 is closed upon a motor unit 104, the force generated by the clamp 420 causes the flap 432 first to pivot toward the center of the carriage 168 closing the very small gap and then second to stretch tangentially toward the tab 460. Of course, because the flap 432 may be constructed of aluminum or other metals or metallic alloys, the flap 432 stretches only a small degree; however, the stretching results in a powerful compressive force that secures the connection portion 116 to the carriage 168 without permitting the motor unit 104 to rotate or translate vertically relative to the carriage 168.

The clamp adjustment mechanism 436 determines the magnitude of the compressive force applied to the motor unit 104 in the following manner. When the motor clamp 420 is closed, axle 476 is drawn away from the carriage 168, against the bolt 480. Thus, the position of the bolt 480 determines the distance axle 476 may extend from the carriage 168. This distance is referred to as link 496. Based on the principle of a four bar linkage, increasing the length of link 496 decreases the force required to position the clamp 420 in an over center orientation. Likewise, decreasing the length of link 496 increases the force required to position the clamp 420 in an over center position. Accordingly, the magnitude of the compressive force applied to the motor unit 104 by motor clamp 420 may be increased or decreased by adjusting the position of bolt 480 and the associated axle 476. Furthermore, note that because link 496 extends from axle 476 toward the center of the mouth 146 through tab 460, the orientation of link 496 may be represented by lines of varying angles. In particular, link 496 may extend from axle 476 to the corner of the tab 460, as represented by dashed line 490 of FIG. 7. The chosen orientation of link 496 represents the resultant of the force vectors applied to link 496.

Figure 9:
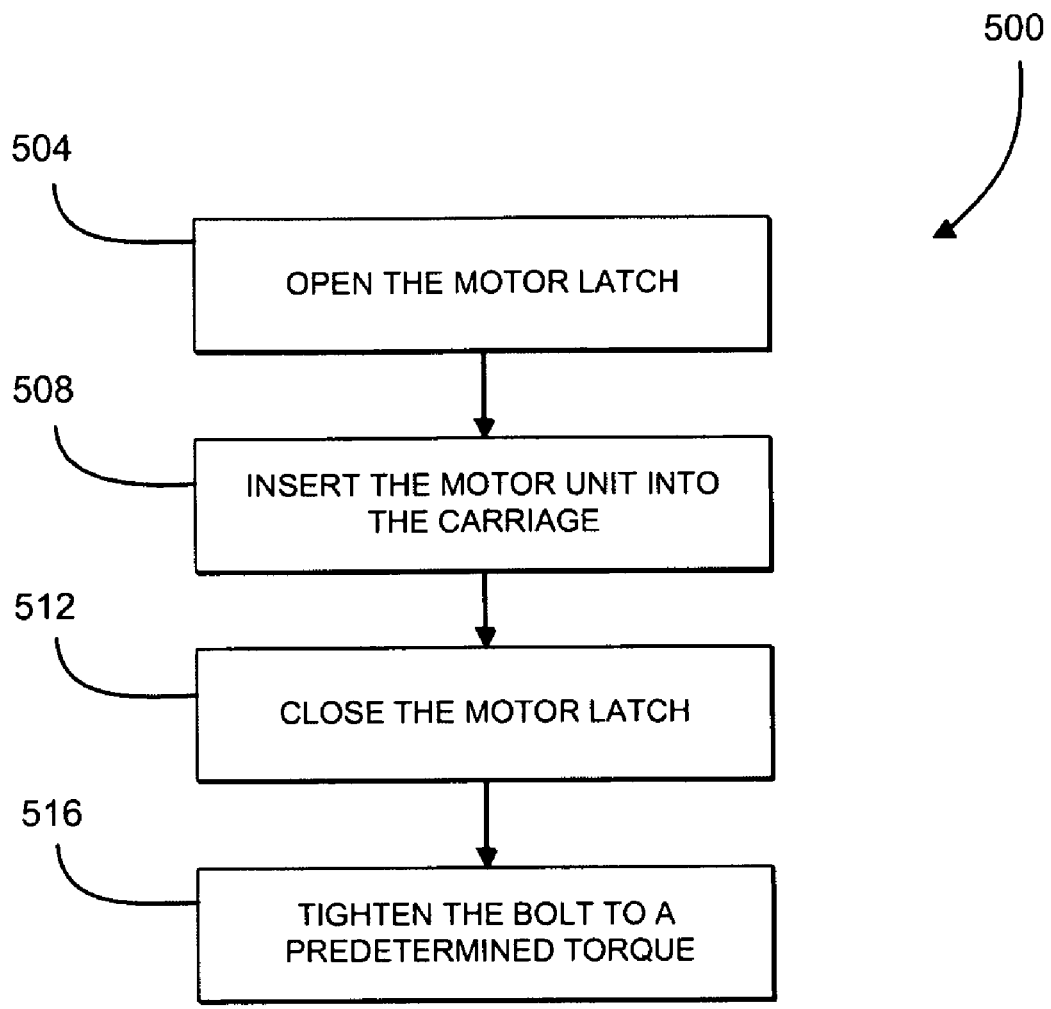
FIG. 9 illustrates a flowchart depicting an exemplary method for adjusting the force with which the motor latch of FIG. 5 and FIG. 6 secures a motor unit to a base unit.

Referring now to the flowchart of FIG. 9, a method 500 is presented for utilizing the clamp adjustment mechanism 436 to apply a predetermined magnitude of compressive force to the motor unit 104. As shown in block 504, the method 500 starts with opening the motor clamp 420. Next, as shown in block 508, the motor unit 104 is inserted into the carriage 168. As shown in block 512, once the motor unit 104 is inserted into the carriage 168 the motor clamp 420 is closed. Initially, the bolt 480 may only be partially threaded into the lateral channel that extends in the direction of line 487, such that the bolt 480 is flush with the surface of the nut 484 proximate the axle 476. Next, as provided in block 516, the bolt 480 is tightened to a predetermined torque. As the bolt 480 is tightened, axle 476 is forced to the rear of the lateral channel, which, as described above, decreases the length of link 496 and increases the compressive force upon the motor unit 104. Thus, there exists a correlation between the torque of the bolt 480 and the compressive force generated by the motor clamp 420. This correlation simplifies the compressive force adjustment process of the motor clamp 420, such that a consistent compressive force can be attained without repeatedly opening and closing the clamp 420. Accordingly, the method 500 effectively configures the motor clamp 420 to deliver a predetermined compressive force upon the motor unit 104, requiring the motor clamp 420 to be closed only one time. Of course, the method 500 permits a user to open and close the motor clamp 420 numerous times as may be necessary for other reasons; however, it is possible to close the clamp 420 only once during the compressive force adjustment process.

The foregoing method 500 is particularly useful during the manufacturing process for the modular router 100, because the manufacturer typically sells the modular router 100 with the motor clamp 420 configured to apply a predetermined clamping force to the motor unit 104. Accordingly, during manufacture of the modular router 100, the manufacturer may follow the simple steps set forth in FIG. 9 to set the clamping force without the need for repeatedly opening and closing the motor clamp 420 to set the desired clamping force properly.

The Release Latch

Figure 14:
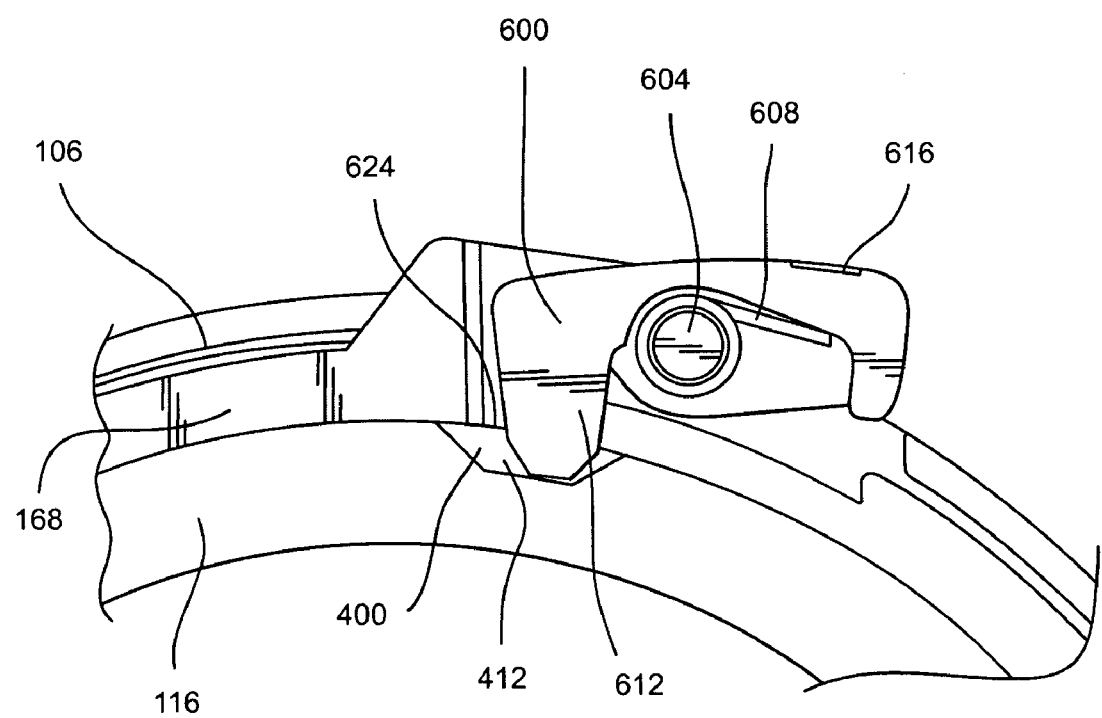
FIG. 14 illustrates a top plan view of the release latch of FIG. 10 and the motor unit of FIG. 4.

Referring now to FIGS. 10-14, a release latch 600 is provided on the base unit 106 to prevent the motor unit 104 from becoming separated from the base unit 106. The release latch 600 is pivotally mounted to the exterior of the carriage 168 and the base unit 106. The latch 600 includes a finger 612 and a contact tab 616. As shown in FIG. 11 and FIG. 14, a post 604 extends vertically through a central channel in the release latch 600 and forms an axis of rotation. A biasing member such as a spring 608 biases the finger 612 of the latch 600 toward a notch provided as an opening 624 in the carriage 168 of the base unit 106. The opening 624 has dimensions slightly larger than the finger 612, as illustrated in FIG. 10. The spring 608 biases the release latch 600 such that the finger 612 normally extends through the opening 624 and into an interior portion of the base unit 106.

As most clearly illustrated in FIG. 5 and FIG. 6, the contact tab 616 is a flat region of the release latch 600 having a surface area large enough for a person to locate and press easily and comfortably, even while wearing gloves or other protective devices. When the contact tab 616 is pressed against the carriage 168 the release latch 600 pivots about post 604 causing the finger 612 to exit the opening 624 such that the finger 612 no longer reaches into the interior portion of the base unit 106. Although the release latch 600 is illustrated upon the standard base in FIG. 10 and FIG. 11, the release latch functions equally well and similarly when installed upon a plunge base unit 108.

As illustrated in FIGS. 12-14, the shape of the finger 612 is configured to engage the tapered groove 400 upon the connection portion 116 of the motor unit 104. Specifically, as illustrated in FIG. 12 and FIG. 13, the top side of the finger 612 includes a chamfered or angled surface 628 that approximately matches the chamfering of the chamfered rim 143. The bottom surface of the finger 612 is formed to match the shape of the shoulder 412. In particular, the bottom surface may be formed at an approximately ninety degree angle. Furthermore, the width of the finger 612 is less than the width of the tapered groove 400 such that the finger 612 may be inserted into the tapered groove 400 and against the inclined surface 408 when the motor unit 104 is inserted into the base unit 106, as illustrated in FIG. 14.

In operation, the release latch 600 provides an additional mechanism configured to secure the motor unit 104 to the base unit 106. As illustrated in FIG. 12, when the motor unit 104 is properly inserted into the mouth 146 in the base unit 106 in the direction of arrow 407, the chamfered rim 143 of the connection portion 116 contacts the top surface 628 of the finger 612. Continued downward movement of the motor unit 104 causes the top surface 628 of the finger 612 to slide upon the chamfered rim 143 away from the motor unit 104. The movement of the finger 612 is directed against the resistance of the spring 608.

Further downward movement of the motor unit 104 causes the chamfered rim 143 to slide past the finger 612, at which point the spring 608 forces the finger 612 against the gap 147. Continued downward movement positions the gap 147 below the finger 612, as illustrated in FIG. 13. When the gap 147 is completely below the finger 612, the spring 608 pivots the finger 612 toward the motor unit 104, thereby inserting the finger 612 into the tapered groove 400. The inclined surface 408 of the tapered groove 400 provides a smooth surface for the finger 612 to slide upon while the position of the motor unit 104 is adjusted to set the depth of the router bit.

In one embodiment, the biasing force developed by the spring 608 may strongly force finger 628 into contact with the inclined surface 408 of the tapered groove 400. In particular, once finger 628 has become seated against the inclined surface 408, the finger 628 stabilizes the vertical position of the motor unit 104 relative the base unit 106. Furthermore, after the finger 628 contacts the inclined surface 408, an increasingly greater downward force must be exerted upon the motor unit 104 in order to further lower the motor unit 104 into the base unit 106. An increasing force is required because as the motor unit 104 is lowered further into the base unit 106 the inclined surface 408 forces the finger 628 to pivot further out of the opening 624, thereby generating an increased biasing force in spring 608. In addition as the motor unit 104 is raised or withdrawn from the base unit 106 the force of the finger 628 against the inclined surface 408 reduces the force required to withdraw the motor unit 104 from the base unit 106. The biasing force applied to finger 628 may be developed solely by spring 608, which is capable of providing a strong spring force. Additionally or alternatively, a compression spring may be coupled between the carriage 168 and the rear surface of the contact tab 616 in order to increase force of the finger 628 against the inclined surface 408.

Referring still to FIG. 13, when the motor unit 104 is slid upward relative the carriage 168, the spring 608 forces the finger 612 against the inclined surface 408, such that the finger 612 abuts the shoulder 412 as the motor unit 104 is drawn near the top of the carriage 168. Specifically, when the motor unit 104 has been inserted far enough into the mouth 146 in the carriage 168 to cause the finger 612 to be seated in the tapered groove 400, an upward directed force upon the motor unit 104 causes the shoulder 412 to contact the bottom surface of the finger 612. Thus, the shoulder 412 provides a positive stop that limits movement of the motor unit 104 when it is positioned in the base unit 106. The motor unit 104 cannot be removed from the base unit 106 when the finger 612 is seated in the tapered groove 400 upon the shoulder 412 without damaging the motor unit 104, the release latch 600, or the carriage 168. Accordingly, in order to remove the motor unit 104 from the carriage 168, the finger 612 must be pivoted away from the connection portion 116 such that no portion of the finger 612 extends within the tapered groove 400. In particular, the motor unit 104 can be removed when no portion of the finger 612 extends across dashed line 404 of FIG. 12 and FIG. 13. The finger 612 may be removed from the tapered groove 400 by applying pressure to the contact surface 616 until the backside of the contact surface 616 abuts the exterior of the carriage 168. Once again, the release latch 600 functions similarly when installed upon either the plunge base unit 108 or the standard base unit 112.

Motor Unit Adjustment in the Standard Base Unit

The carriage 168 described above may be attached to the standard base 112, as illustrated in FIG. 2 and FIG. 5. The standard base 112 is configured to secure the motor unit 104 in a position that permits a router bit to extend beyond the work contact surface 156 by a fixed distance. Specifically, the distance by which the router bit extends may be adjusted; however, once a position has been chosen, the position may not be readjusted while the motor 282 is in operation. The standard base 112 includes opposing handles 160, 164, a macro adjustment system 648, and a fine adjustment system 652. The opposing handles 160, 164 of the standard base 112 are connected to the lower portion of the carriage 168 and/or the upper surface of the base plate 152. The position of the handles 160, 164 is fixed relative the base 112. The handles 160, 164 may be constructed from materials including, but not limited to, wood, metal, plastic, and other rigid materials.

Referring now to FIGS. 5, 8, 10, and 11, the macro adjustment system 648 is configured to position the router bit in one of a plurality of predetermined positions below the base plate 152. The macro adjustment system 648 includes a motor depth adjustment latch 656, and a biasing member 660. The motor depth adjustment latch 656 is pivotally secured to the exterior of the carriage 168, as explained below with reference to the fine adjustment mechanism 652. The motor depth adjustment latch 656 includes a protuberance provided as a detent 658 configured to secure the motor unit 104 to the carriage 168. The biasing member 660 normally biases the depth adjustment latch 656 in an engaged position. In the engaged position, the biasing member 660 biases the detent 658 through an elongated slot 664 toward the center of the mouth 146 in the carriage 168, such that a portion of the detent 658 resides within the interior portion of the carriage 168, as illustrated by dashed line 666 of FIG. 11. By pressing the portion of the depth adjustment latch 656 referred to as a pad 662, the depth adjustment latch 656 may be pivoted to a disengaged position. In the disengaged position the detent 658 is pivoted away from the carriage 168 and out of the elongated slot 664, such that no portion of detent 658 extends within the mouth 146 of the carriage 168.

Before inserting a motor unit 104 into the carriage 168 the depth adjustment latch 656 must first be pivoted to the disengaged position, so that the detent 658 does not extend through the opening 664. If the depth adjustment latch 656 is not pivoted to the disengaged position before inserting a motor unit 104 into the carriage 168, the connection portion 116 of the motor unit 104 abuts the detent 658, which could damage the detent 658 or the connection portion 116. After the motor unit has been inserted into the carriage 168, pressure upon the pad 622 can be relaxed, thereby allowing the biasing member 600 to pivot the detent 658 through the opening 664 toward the connection portion 116. The motor unit 104 can then be vertically translated relative the carriage 168 until the biasing member 660 biases the detent 658 into one of the notches 142 upon the exterior of the connection portion 116. By positioning the detent 658 within one of the notches 142 a distance upon which the router bit extends from the work engaging surface 156 can be adjusted. Furthermore, note that the dimensions of the detent 658 are slightly smaller than the dimensions of the notch 142, such that the detent 658 fits securely within the notch 142.

Referring to FIG. 5 and FIG. 10, the fine adjustment system 652 is configured to precisely determine the distance by which the router bit extends from the work engaging surface 156. The fine adjustment system 652 includes an adjustment knob 668 and a threaded shaft 672. The threaded shaft 672 is vertically mounted parallel to the longitudinal axis of the carriage 168. The adjustment knob 668 is secured to the top of the threaded shaft 672. Rotation of the knob 668 causes the threaded shaft 672 to rotate. The depth adjustment latch 656 of the macro adjustment system 648 includes a threaded channel configured to threadingly engage the threaded shaft 672. As the adjustment knob 668 is rotated, the depth adjustment latch 656 moves up or down upon the threaded shaft 672. Accordingly, opening 664 should have a length greater than the desired degree of vertical translation of the depth adjustment latch 656. When the detent 658 is engaged to a notch 142 in the connection portion 116, movement of the detent 658 causes the motor unit 104 to precisely move up or down, in the direction of the motor axis 138, depending on the direction of rotation.

Motor Unit Adjustment in the Plunge Base Unit

Figure 15:
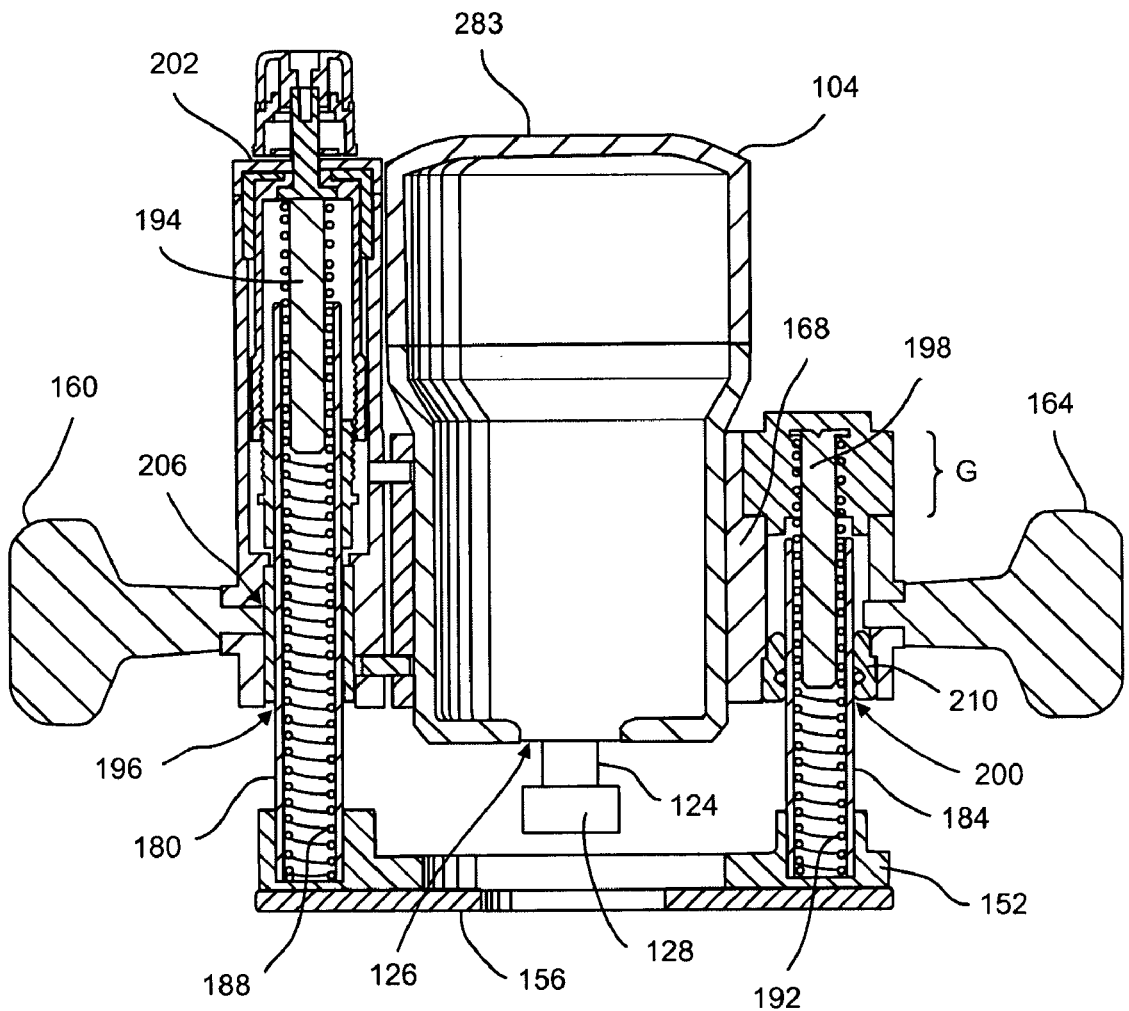
FIG. 15 illustrates a cutaway elevational view of the motor unit of FIG. 1 and a plunge base unit.

With reference to FIG. 6 and FIG. 15, the plunge base unit 108 includes a primary plunge post 180, secondary plunge post 184, a primary compression spring 188, and a secondary compression spring 192. The plunge posts 180, 184 may be made from metal or any other rigid and straight material. One end of each plunge post 180, 184 extends into first and second channels 196, 200 in the carriage 168. The other end of each plunge post 180, 184 is coupled to the base plate 152. Each plunge post 180, 184 also includes a hollow interior cavity that houses the compression springs 188, 192. In particular, the primary compression spring 188 extends throughout the hollow interior cavity of the primary plunge post 180, and the secondary compression spring 192 extends throughout the hollow interior cavity of the secondary plunge post 184. The top end of the compression springs 188, 192 extends from the top of the plunge posts 180, 184 and contacts a ceiling 202 of the channels 196, 200. The bottom end of the compression springs 188, 192 contact a portion of the base plate 152. The springs 188, 192 bias the carriage 168 in an upper position, in which the router bit is held above the work engaging surface 156.

The carriage 168 is configured to slide upon the plunge posts 180, 184 from the upper position to a lower position, in which the router bit extends below the work contact surface 156 by a predetermined distance. As illustrated in FIG. 15, a gap G exists between the top of the plunge posts 180, 184 and the ceiling 202 of the channels 196, 200. This gap G represents a distance by which the carriage 168 may be slid down the plunge posts 180, 184, by applying a downward force to the opposing handles 160, 164. In particular, the carriage 168 may be slid down the plunge posts 180, 184 until the ceiling 202 contacts the top of the plunge posts 180, 184. As the carriage 168 is slid down the plunge posts 180, 184 the ceiling 202 forces the springs 188, 192 to compress, thereby generating a biasing force suitable to lift the carriage 168 to the upper position, when the downward force upon the handles 160, 164 is relaxed. Note that spring guides 194, 198 ensure that the springs 188, 192 remain on a vertical longitudinal axis as the carriage 168 is moved from the upper to the lower position.

Referring now to FIG. 15, bearings 206, 210 are seated in the channels 196, 200 to ensure the carriage 168 slides smoothly upon the plunge posts 180, 184. Although any type of bearing 206, 210 may be utilized, the bearing 206 surrounding the primary plunge post 180 should generally have a lower manufacturing tolerance level than the bearing 210 surrounding the secondary plunge post 184. In particular, due to manufacturing tolerances and the stacking effect of tolerance values, it is expensive and difficult to manufacture a carriage 168 that slides properly upon the plunge posts 180, 184 properly when two bearing 206, 210 of high precision are utilized. Therefore, the primary bearing 206 may have a larger bearing surface and in some embodiments a tighter fit upon the plunge post 180 (i.e., a relatively small clearance between the primary bearing 206 and the plunge post 180), such that the primary bearing 206 guides and positions the carriage 168 to move properly between the upper and lower positions. Alternatively, the secondary bearing 210 may have a smaller bearing surface and may have a looser fit upon the plunge post 184 (i.e., a greater clearance between the secondary bearing 210 and the secondary plunge post 184 as compared to the clearance between the primary bearing 206 and the primary plunge post 180). With this arrangement, the secondary bearing 210 prevents the carriage 168 from rotating about the primary plunge post 180 and only guides the path of the carriage 168 to a minimal extent.

Sleeve Bearing in the Plunge Base Unit

Figure 16:
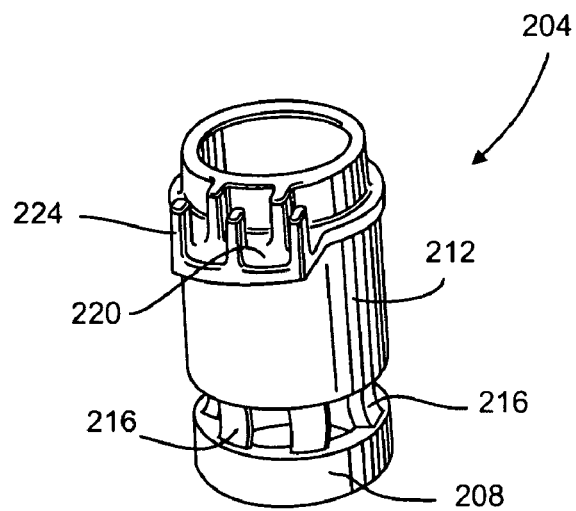
FIG. 16 illustrates a perspective view of a sleeve bearing for use with a plunge base unit.
Figure 17:
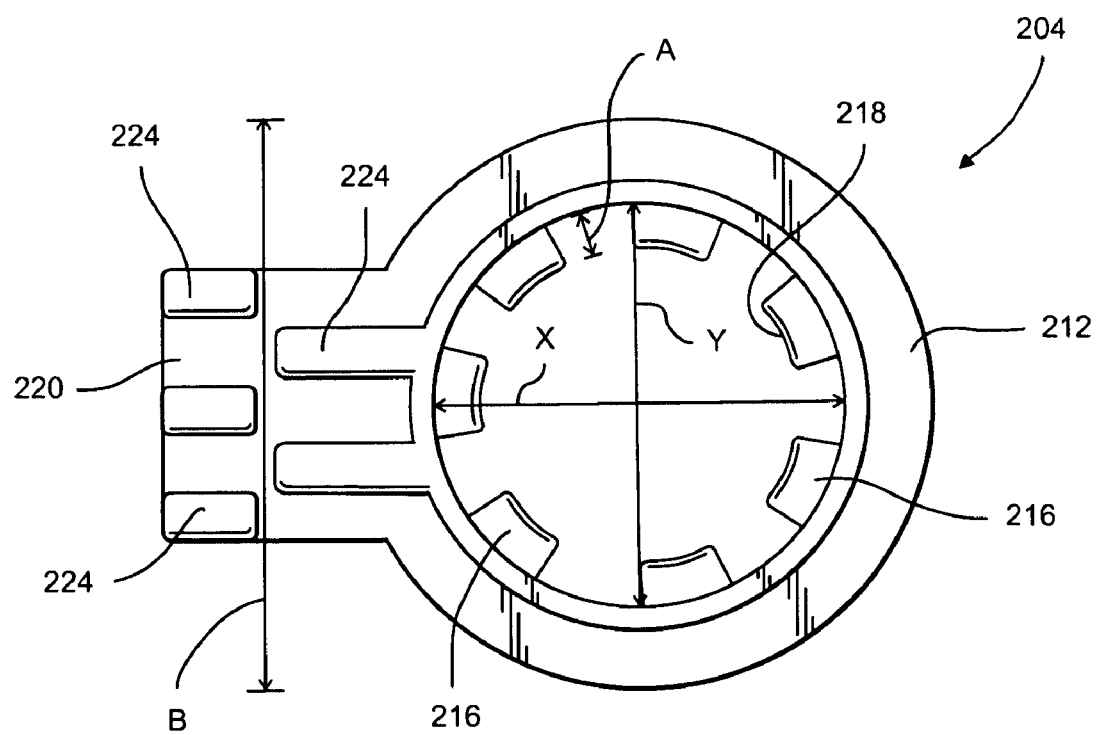
FIG. 17 illustrates a top view of the sleeve bearing of FIG. 16.
Figure 17A:
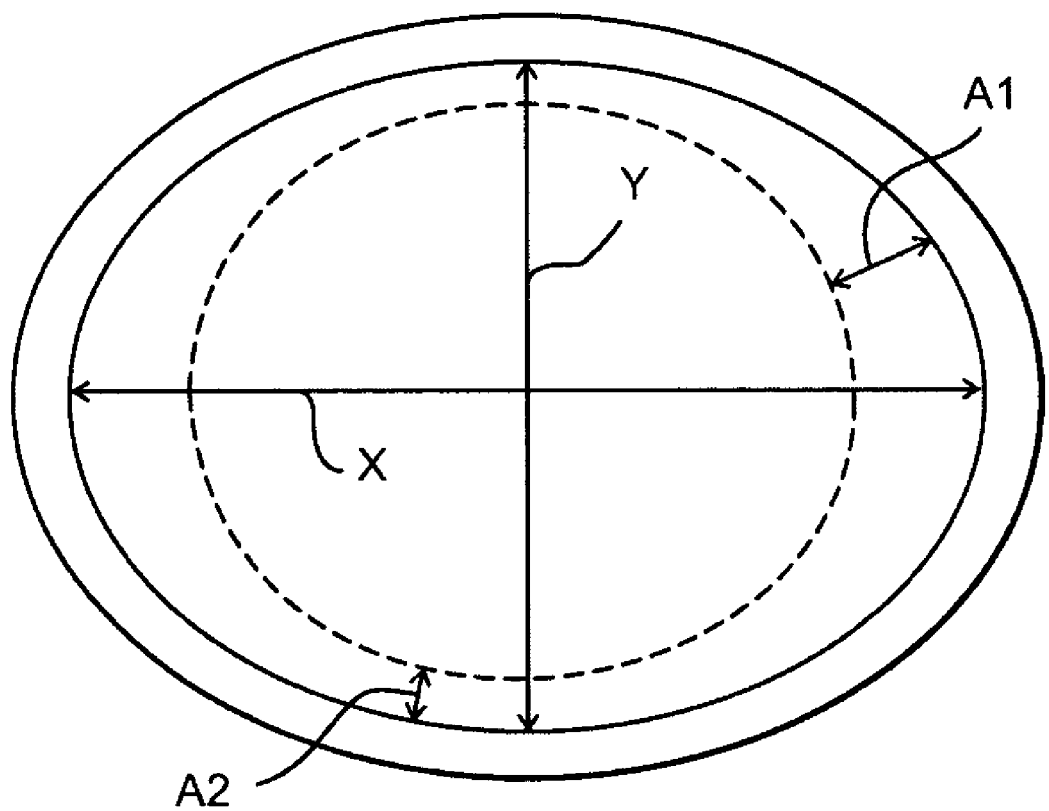
FIG. 17A illustrates a top view of the sleeve bearing of FIG. 16 with the sleeve bearing having exaggerated elliptical cross-section.
Figure 18:
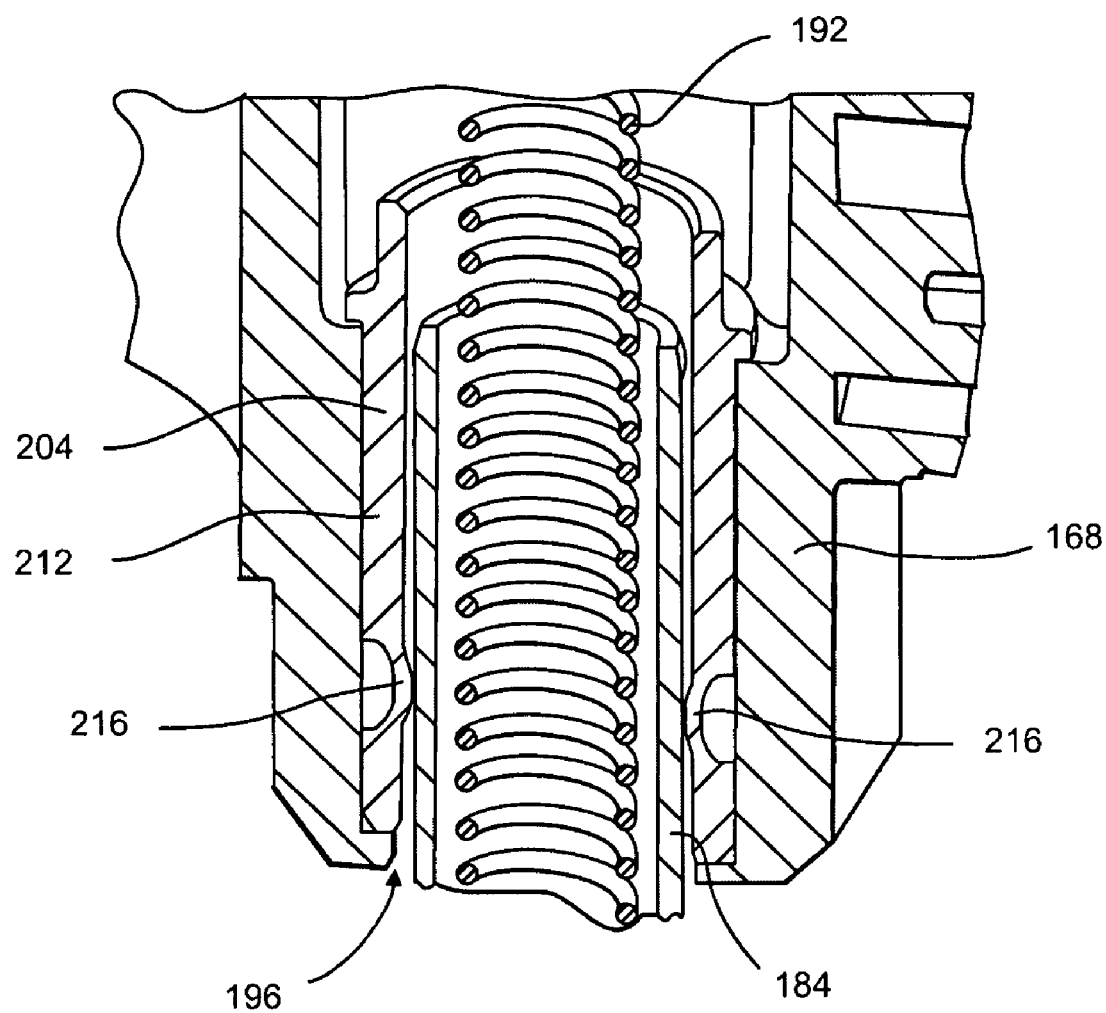
FIG. 18 illustrates a cutaway perspective view of the sleeve bearing of FIG. 16 coupled to a plunge base unit.
Figure 19:
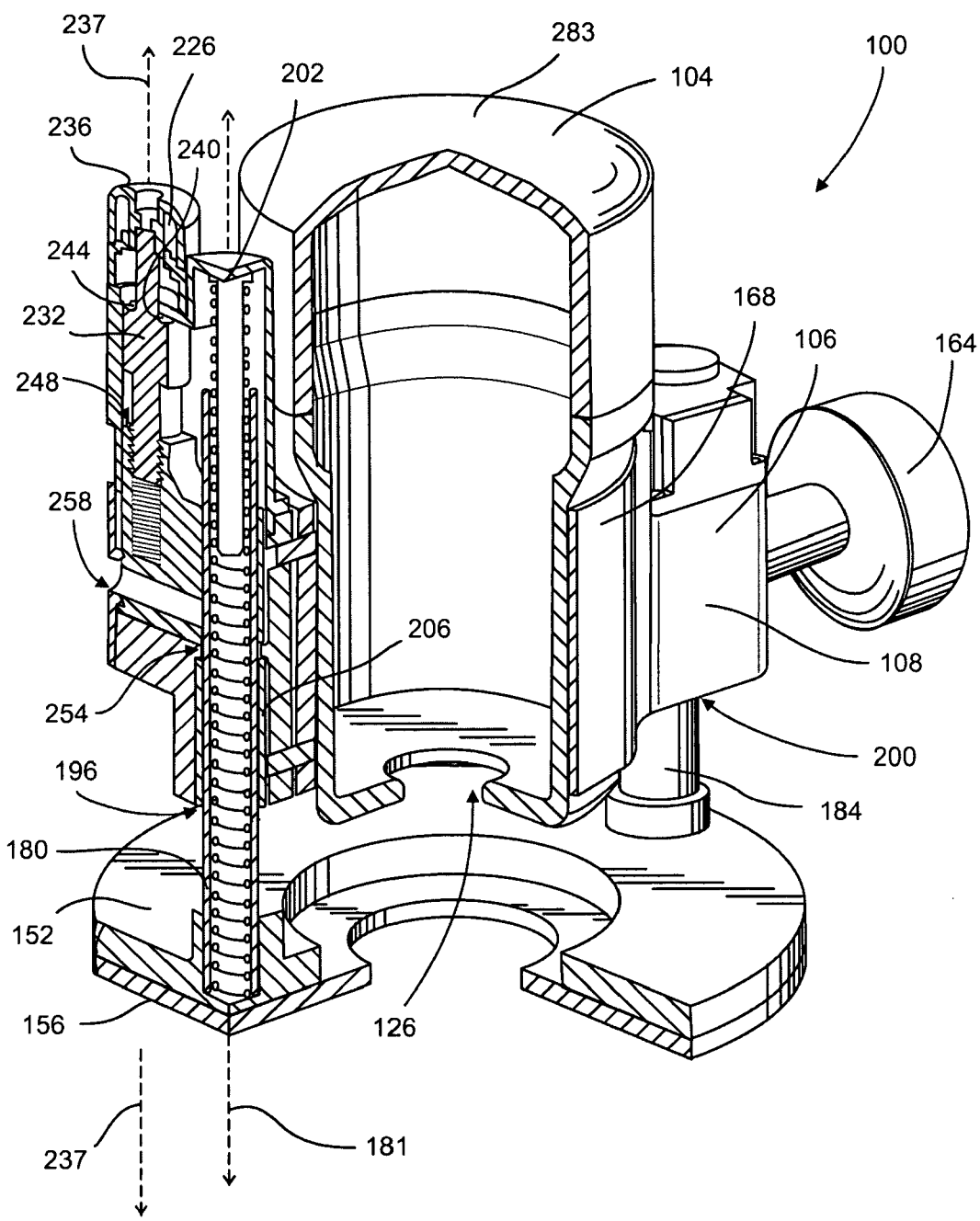
FIG. 19 illustrates a cutaway perspective view of a plunge base unit having an offset fine adjustment mechanism.

The secondary bearing 210 may be provided in some embodiments as the sleeve bearing 204 illustrated in FIGS. 16-18. The sleeve bearing 204 may be formed of various materials having a high lubricity such as polyoxymethylene or other lightweight wear-resistant low-friction thermoplastic polymers. The sleeve bearing 204 includes a lower portion 208, an upper portion 212, a flexible portion provided as ribs or fingers 216, and a wire guide 220. In general, the bearing 204 has a shape complimentary to the shape of the plunge posts 180, 184. In the disclosed embodiment, the bearing 204 is generally an elliptic cylinder having an elliptical cross-section. While the elliptical cross-section of the bearing 204 is not easily discernable from FIG. 16 and FIG. 17, it will be noted that FIG. 17A illustrates the sleeve bearing 204 (without the wire guide 220) having an exaggerated elliptical cross-section. In particular, the length represented by line X is greater than the length represented by line Y in the sleeve bearing 204 illustrated in FIG. 17 and FIG. 17A; however, the difference between length X and Y is greatly exaggerated in FIG. 17A. In other embodiments, the bearing 204 may exhibit a circular cross-sectional shape. The bearing 204 may be nonmovably secured to a channel 196, 200 in the carriage 168 as illustrated in FIG. 18.

The plurality of fingers 216 connect the lower portion 208 of the sleeve bearing 204 to the upper portion 212 of the sleeve bearing 204. The fingers 216 may be approximately evenly sized and approximately evenly spaced around the circumference of the bearing 204. As best seen in FIG. 18, the fingers 216 may be curved toward a center longitudinal axis of the bearing 204, wherein a convex interior surface 218 of the fingers 216 engages the plunge post 180, 184.

The flexible fingers 216 provide an engaging surface for the plunge posts 180, 184, the engaging surface having a variable size and shape. For instance, the flexible fingers 216 may adjust to the position of the plunge posts 180, 184 by flexing away from the longitudinal center of the bearing 204, but still contacting the plunge post 180, 184. Each finger 216 may flex as much as a distance equal to the length represented by line A of FIG. 17 and lines A1 and A2 of FIG. 17A. Thus, the bearing 204 is configured to engage plunge posts 180, 184 of varying sizes and in varying positions firmly, while permitting the carriage 168 to slide smoothly thereon.

Figure 17B:
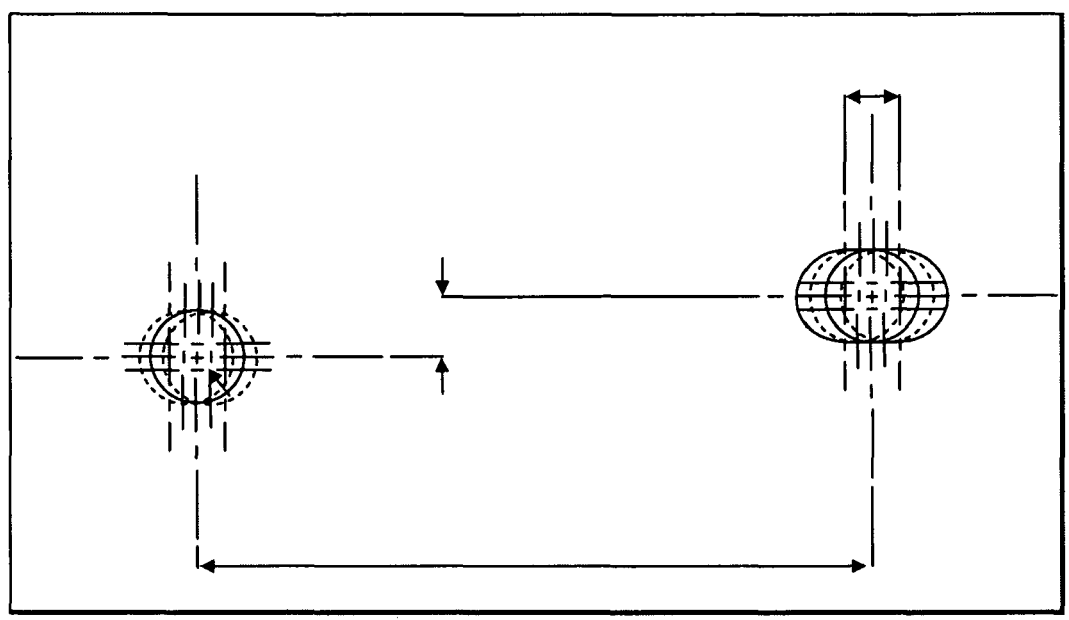
FIG. 17B illustrates the tolerance variation of the plunge posts of the plunge base due to manufacturing and tolerance stack up.

The flexible nature of the fingers 216 reduces the perceived effects of the manufacturing tolerance stack-up. In particular, plunge routers 108 typically require two bearings that guide the plunging action of the carriage 168 along the plunge posts 180, 184. Due to general manufacturing tolerances as well as the stacking of tolerance values, as illustrated in FIG. 17B, it is difficult to design a plunge router 108 having a tight fit between both the primary guide bearing 206 and the secondary guide bearing. Accordingly, the primary bearing 206 may be designed to have a larger bearing surface and a tighter fit about the plunge post 108, such that the primary bearing 206 does most of the guiding and positioning of the carriage 168. The secondary bearing now takes on the role of anti-rotation while also having some guiding responsibility. In response to the tolerances and manufacturing variations sleeve bearing 204 may be provided with an elliptical cross-section, as discussed above. The distance between the foci of the ellipse is a direct correlation to the stack tolerance needed to provide clearance in the sleeve bearing 204 for plunge post 184. This clearance improves the overall feel of the plunge action, and minimizes the chance of "sticktion" or interruptions in the smooth plunge action. Furthermore, the flexible fingers 216 of the sleeve bearing 204 taking up the rotational tolerance between plunge post 184 and channel 200. In other words, the flexible fingers of the sleeve bearing 204 eliminates any user perceived gaps or "play" between the carriage 168 and the plunge posts 180, 184. Furthermore, note that embodiments of the sleeve bearing 204 formed from a polyoxymethylene material do not require lubrication in order to slide smoothly along the plunge post 180, 184.

With reference to FIG. 16 and FIG. 17, the wire guide 220 is formed in the upper portion 212 of the sleeve bearing 204. The guide 220 includes a plurality of offset protrusions in the form of spaced apart posts 224. A wire or wires may be interlaced between the posts 224 and held in a secure position along the length represented by line B of FIG. 17. The wire guide 220 positions a wire or wires beyond a region in which the wires may interfere with the operation of the bearing 204 sliding upon a plunge post 180, 184. In particular, the wire guide 220 may be utilized to prevent a signal wire from becoming pinched between the sleeve bearing 204 and the plunge post 180, 184.

Plunge Base Offset Fine Adjustment Mechanism

Figure 20:
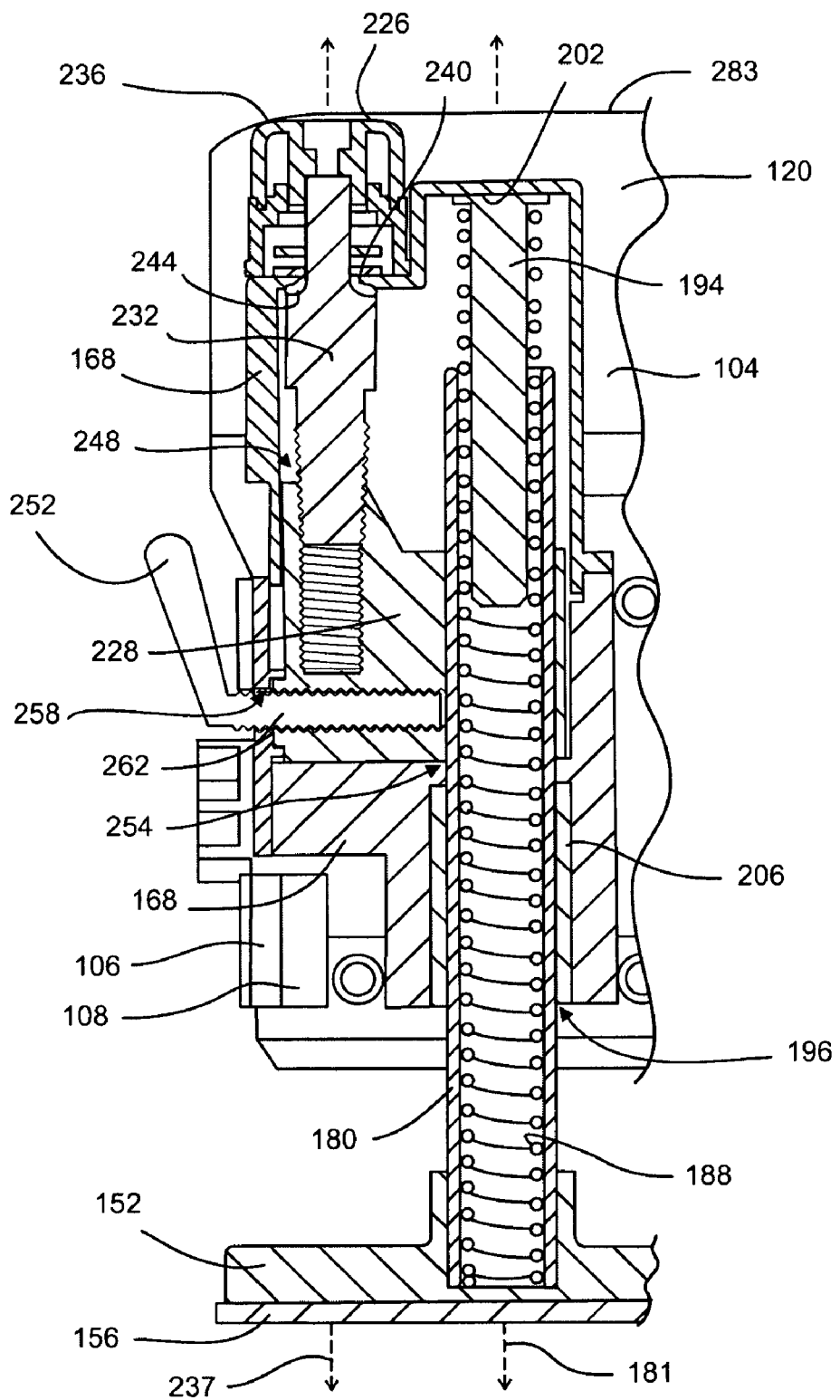
FIG. 20 illustrates a cutaway elevational view of the plunge base unit of FIG. 19.

With reference now to FIGS. 19-23, a fine adjustment mechanism 226 for the plunge base 108 is shown. The fine adjustment mechanism 226, includes a lockpiece 228, an adjustment shaft 232, and an adjustment knob 236. The adjustment shaft 232 extends through an opening 240 in the carriage 168. A shoulder 244 on the shaft 232 abuts the carriage 168 and prevents the shaft 232 from moving upward relative to the carriage 168, as illustrated in FIG. 20. The adjustment knob 236 is secured to the upper end of the shaft 232, wherein rotation of the knob 236 causes the shaft 232 to rotate. The lower end of the adjustment shaft 232 is threadingly engaged to a channel 248 in the lockpiece 228, such that an axis 237 which the adjustment shaft 232 and the adjustment knob 236 rotate about is parallel to the longitudinal axis 181 defined by the plunge post 180. Note that the channel 248 in the lockpiece 228 is offset from the longitudinal axis of plunge post 180, such that the adjustment shaft 232 and the adjustment knob 236 are also offset from the longitudinal axis of the plunge post 180. The non-coaxial position of the adjustment shaft 232 relative the longitudinal axis of the plunge post 180 contributes to a reduction in overall height of the router 100. In particular, the entire fine adjustment mechanism 226 is positioned lower than the upper surface 283 of the motor unit 104 housing when the router 100 is in an upright position.

The lockpiece 228 further includes a lever 252, a vertical channel 254, a transverse channel 258, and a locking shaft 262. The vertical channel 254 provides a passage through the lockpiece 228 having an inside diameter slightly greater than the outside diameter of the plunge posts 180, 184. Note that in some embodiments, the vertical channel 254 may house the primary bearing 206 (see, e.g., FIG. 21). The transverse channel 258 provides a passage through the lockpiece 228 configured to permit a locking shaft 262 to move between a locked and an unlocked position. Lever 252, illustrated in FIG. 20, may be connected to the locking shaft 262 for rotation between an unlocked position and a locked position. In the unlocked position, the vertical channel 254 slides freely along plunge post 180 as the carriage 168 is moved between the upper and lower positions. However, when lever 252 enters the locked position, the lockpiece 228 becomes coupled to plunge post 180. Specifically, movement of the lever 252 causes the locking shaft 262 to move within the transverse channel 258 and firmly press against plunge post 180, thereby preventing motion of the lockpiece 228 relative the plunge post 180, 184. Note that in some embodiments the transverse channel 258 may have a threaded interior surface configured to guide a correspondingly threaded locking shaft 262 into forcible contact with the plunge post 180 in response to rotation of the lever 252.

Depending on the position of the lever 252, the carriage 168 and the motor unit 104 may be vertically displaced independent of the lockpiece 228, thereby permitting the vertical position of the router bit to be adjusted precisely. In particular, when the lever 252 is in the unlocked position the lockpiece 228, the carriage 168, and the motor unit 104 move together as the carriage 168 is moved between the upper and lower positions. However, when the lever 252 is moved the locked position, the adjustment knob 236 may be rotated in a first direction causing the shaft 232 to extend from the lockpiece 228. As the shaft 232 extends from the lockpiece 228, the shoulder 244 of the shaft 232 abuts a portion of the carriage 168 causing the carriage 168, the motor unit 104, and the router bit to move in an upward direction relative the base plate 152. Likewise, when the knob 236 is rotated in a second direction the shaft 232 is drawn into the channel 248 in the lockpiece 228 causing the carriage 168, the motor unit 104, and the router bit to move in a downward direction relative the base plate 152. In this way, the position of the router bit may be adjusted precisely.

The adjustment knob 236 may be constructed of any rigid material including but not limited to, metal, plastic, or wood. Additionally, the adjustment knob 236 may include indicia, which indicate the distance the carriage 168 moves in relation to a rotation of the knob 236. The indicia may be measured in thousands of an inch, $\frac{1}{256}$ of an inch, millimeters, or any other desired measurement unit. Furthermore, note that the shaft 232 and the knob 236 are configured not to exceed the height of the motor unit 104. Thus, the fine adjustment mechanism 226 does not increase the overall height of the router 100.

Figure 21:
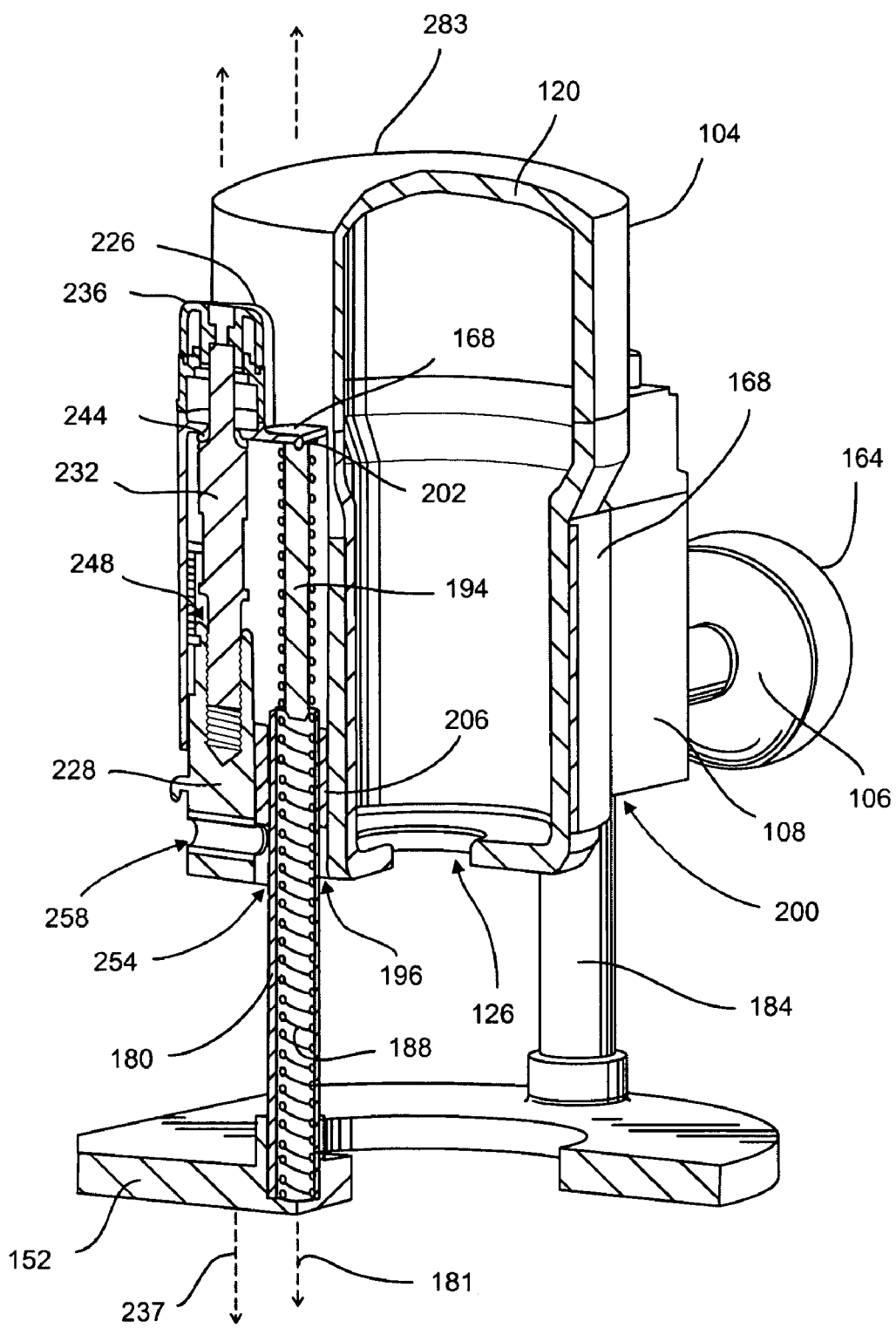
FIG. 21 illustrates a cutaway perspective view of an alternative embodiment of the plunge base unit of FIG. 19.
Figure 22:
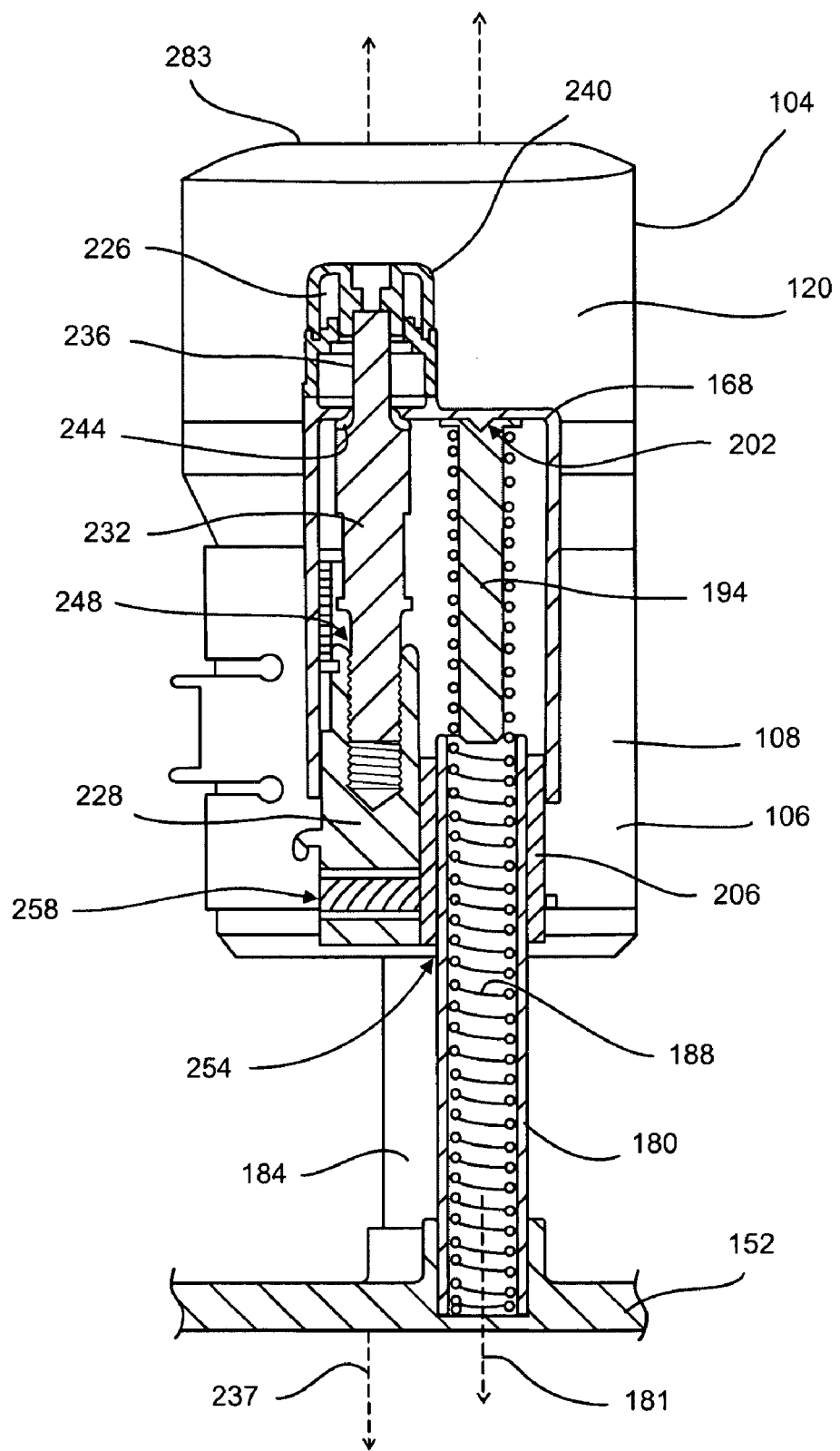
FIG. 22 illustrates a cutaway elevational view of an alternative embodiment of the plunge base unit of FIG. 21.

An alternative embodiment of the plunge base 108 having a fine adjustment mechanism 226 is illustrated in FIG. 21 and FIG. 22. In general, the fine adjustment mechanism 226 includes each of the elements described with reference to the fine adjustment mechanism 226 of FIG. 19 and FIG. 20. However, the fine adjustment mechanism 226 of FIG. 21 and FIG. 22 includes a lockpiece 228 and carriage 168 having a different configuration. Specifically, the carriage 168 surrounds the top portion of the lockpiece 228 only, thereby simplifying the manufacturing process.

Figure 23:
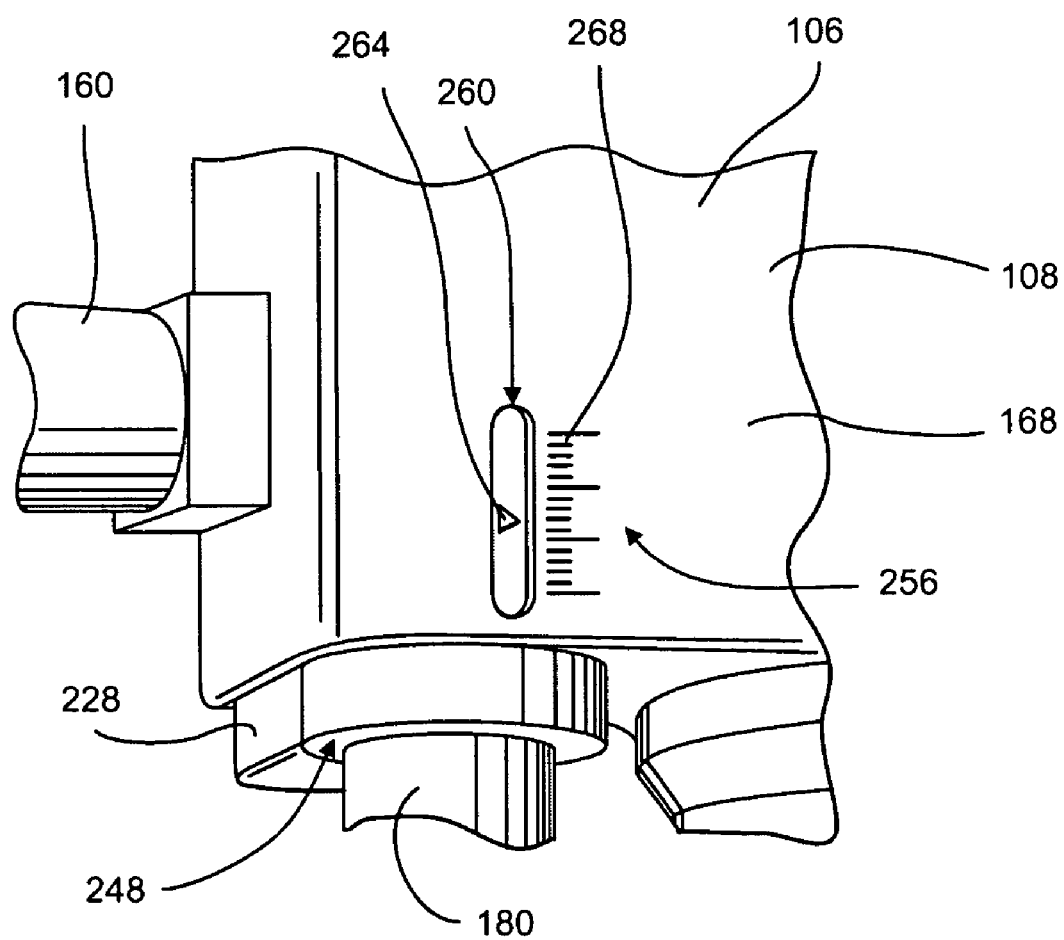
FIG. 23 illustrates a perspective view of a fine adjustment gauge for use with the plunge base unit of FIG. 21.

Referring now to FIG. 23, the plunge base 108 includes a fine adjustment gauge 256 to indicate the position of the adjustment shaft 232 relative the lockpiece 228. The gauge 256 includes an opening 260, a notch 264, and a scale 268. The opening 260 extends through the carriage 168 and exposes a portion of the lockpiece 228. The opening 260 has a length approximately equal to the total range of fine adjustment. The notch 264 is nonmovably positioned upon the lockpiece 228, and is visible through the opening 260. As the adjustment knob 236 is rotated, the opening 260 moves relative to the stationary notch 264. A scale 268 may be printed on the exterior of the carriage 168 to indicate the distance the carriage 168 has moved up or down in response to a rotation of the adjustment knob 236.

Base Unit and Motor Unit Electrical Connectors

The base unit 106 includes an electrical connector 148 configured to engage a corresponding electrical connector 144 upon the motor unit 104, illustrated FIG. 5 and FIG. 6. When electrical connector 148 and electrical connector 144 make electrical contact, an electronic controller 332 (shown in FIG. 25) becomes electrically coupled to the microprocessor 284. Specifically, electrical connector 148 is coupled to an interior portion of the carriage 168 and becomes electrically coupled to electrical connector 144 when the motor unit 104 is properly inserted into the base unit 106.

Figure 6A:
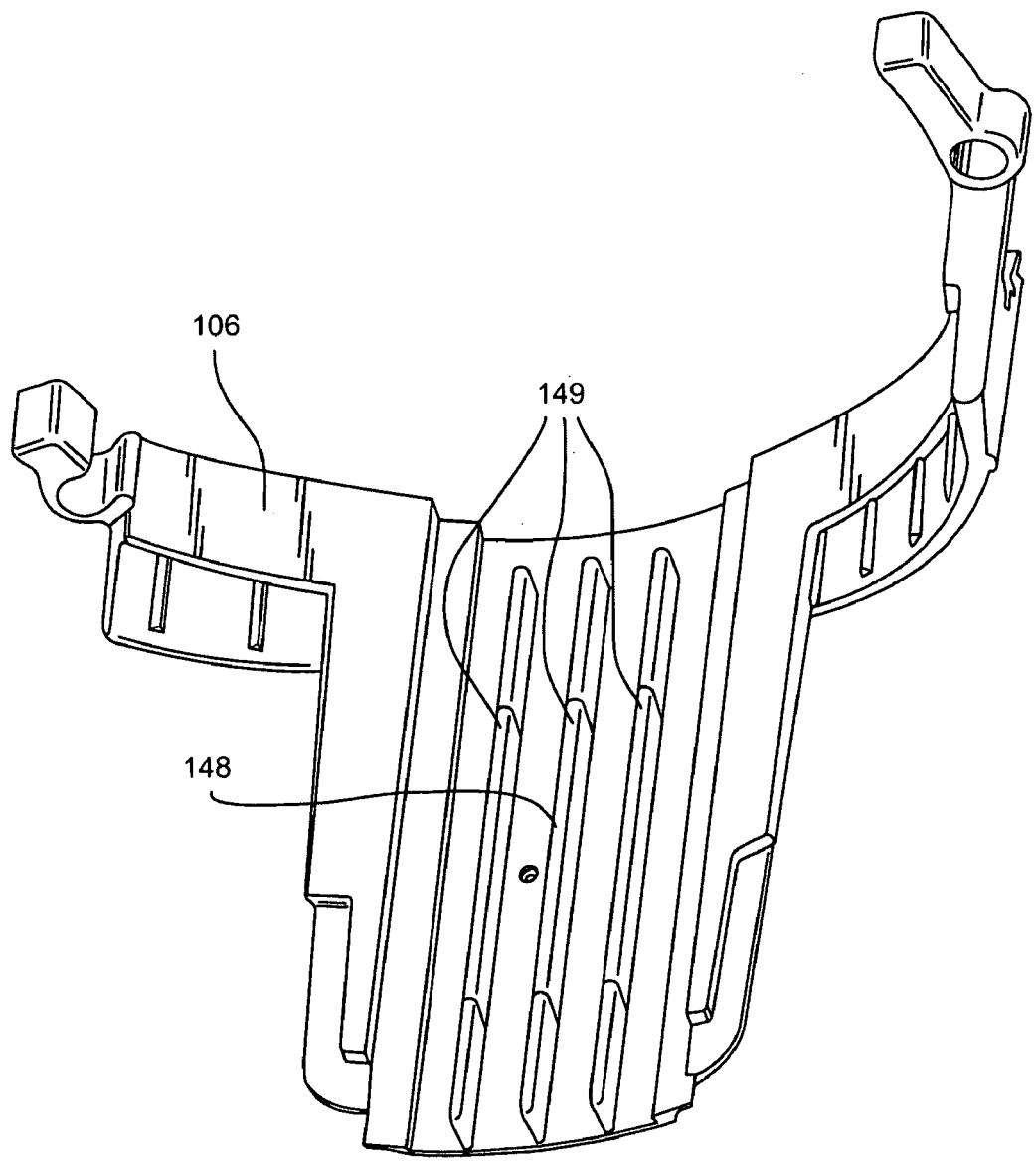
FIG. 6A illustrates a perspective view of an electrical connector for use with the standard base of FIG. 5 or the plunge base of FIG. 6.

Electrical connector 148 includes a plurality of electrical contacts provided as blades 149 electrically coupled to the electronic controller 332, which is housed within a portion of the base 108, 112. As illustrated most clearly in FIG. 6A, electrical connector 148 includes three blades 149. The blades 149 are configured to slide between the receptacles 145 of the electrical connector 144 of the motor unit 104 as the motor unit 104 is inserted into the base unit 106. Furthermore, in regard to the standard base unit 112, the blades 149 are configured to maintain electrical contact with the receptacles 145 as the vertical position of the motor unit 104 is adjusted. Specifically, because the position of the motor unit 104 relative the electrical connector 148 is variable, the blades 149 of electrical connector 148 should be able to maintain an electrical connection as the motor unit 104 is translated about the motor axis 138 within the carriage 168 of the standard base unit 112. Accordingly, the blades 149 of the electrical connector 148 of the standard base unit 112 should have a length at least equal to the distance the motor unit 104 may vertically translate within the standard base unit 112, as illustrated in FIG. 6A.

Base Unit Power Switch

Figure 24:
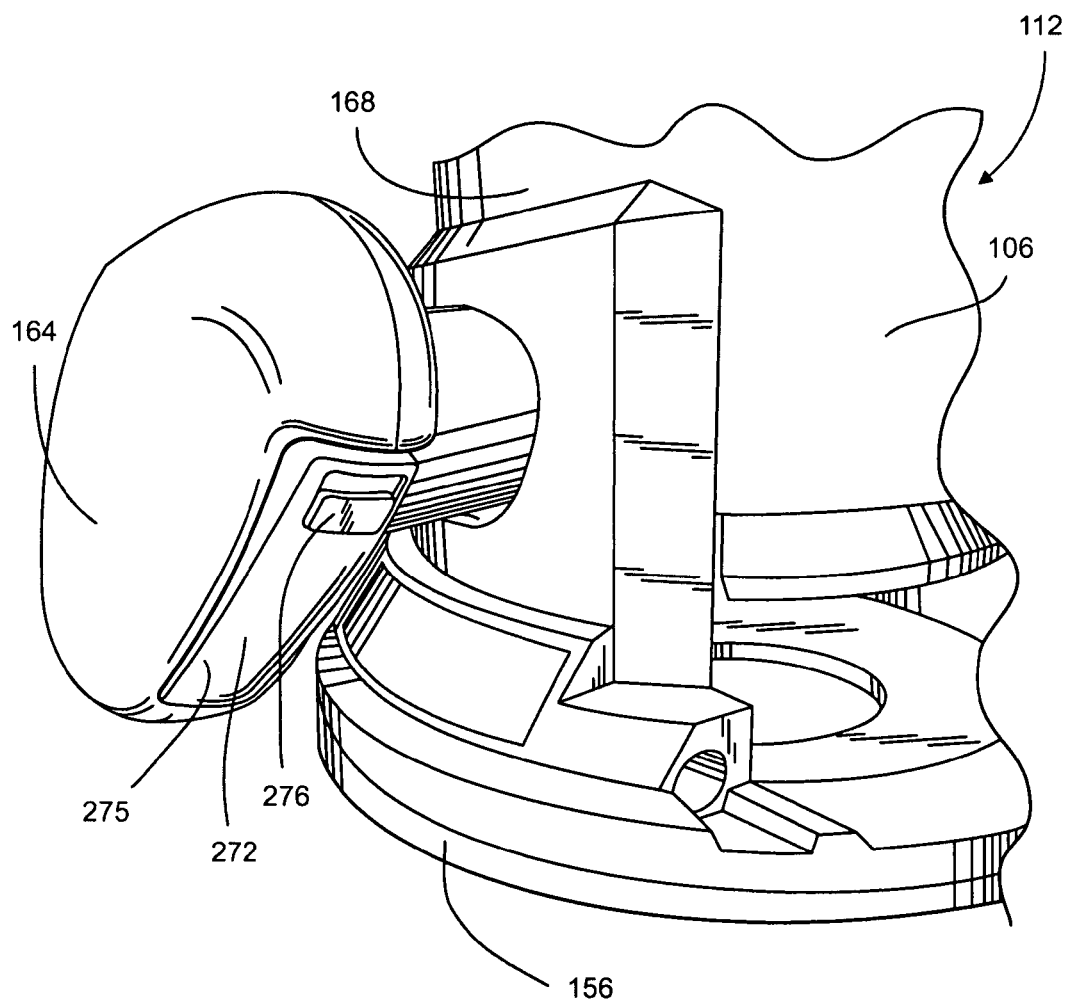
FIG. 24 illustrates a perspective view of a switch for use with a plunge base unit or a standard base unit.

With reference now to FIGS. 24-27, the combination router 100 may be equipped with a power switch 272 having an actuator located on a handle 160, 164 of the base unit 106. The power switch 272 includes a trigger 275 on the handle configured to activate an electrical switch. The electrical switch of the power switch 272, illustrated schematically in FIG. 24, is provided on a printed circuit board 273 housed within the handle 160, 164 of the base unit 106. Electrical traces on the printed circuit board 273 connect the switch 272 to an electronic controller 332 (see e.g. FIG. 25) or a resistor network 682 (see e.g. FIG. 27) in the base unit 106. Signal wires are routed from the printed circuit board through the handle 160, 164 and to the electrical connector 148 on the base unit. The power switch 272 may be configured for movement between an "on" position and an "off" position. In the off position, a pair of electrical contacts within the switch 272 remain in an electrically open configuration, signaling to the electronic controller 332 that the switch 272 has not been depressed. In the on position, the electrical contacts within the switch 272 contact each other, signaling to the electronic controller 332 that the switch 272 has been depressed and that a user desires to supply the motor 282 with power.

The switch 272 may be configured to include a lock tab (shown in FIG. 24 as a trigger lock 276) for securing the switch 272 in the on position. In particular, the trigger lock 276 may be engaged after the switch 272 has been moved to the on position. The trigger lock 276 secures the switch 272 in the on position even when a user has released the switch 272. The switch 272 having a trigger lock 276 may be installed upon either or both of the handles 160, 164 of the base unit 106.

Base Sensing Electronic Circuitry

Figure 25:
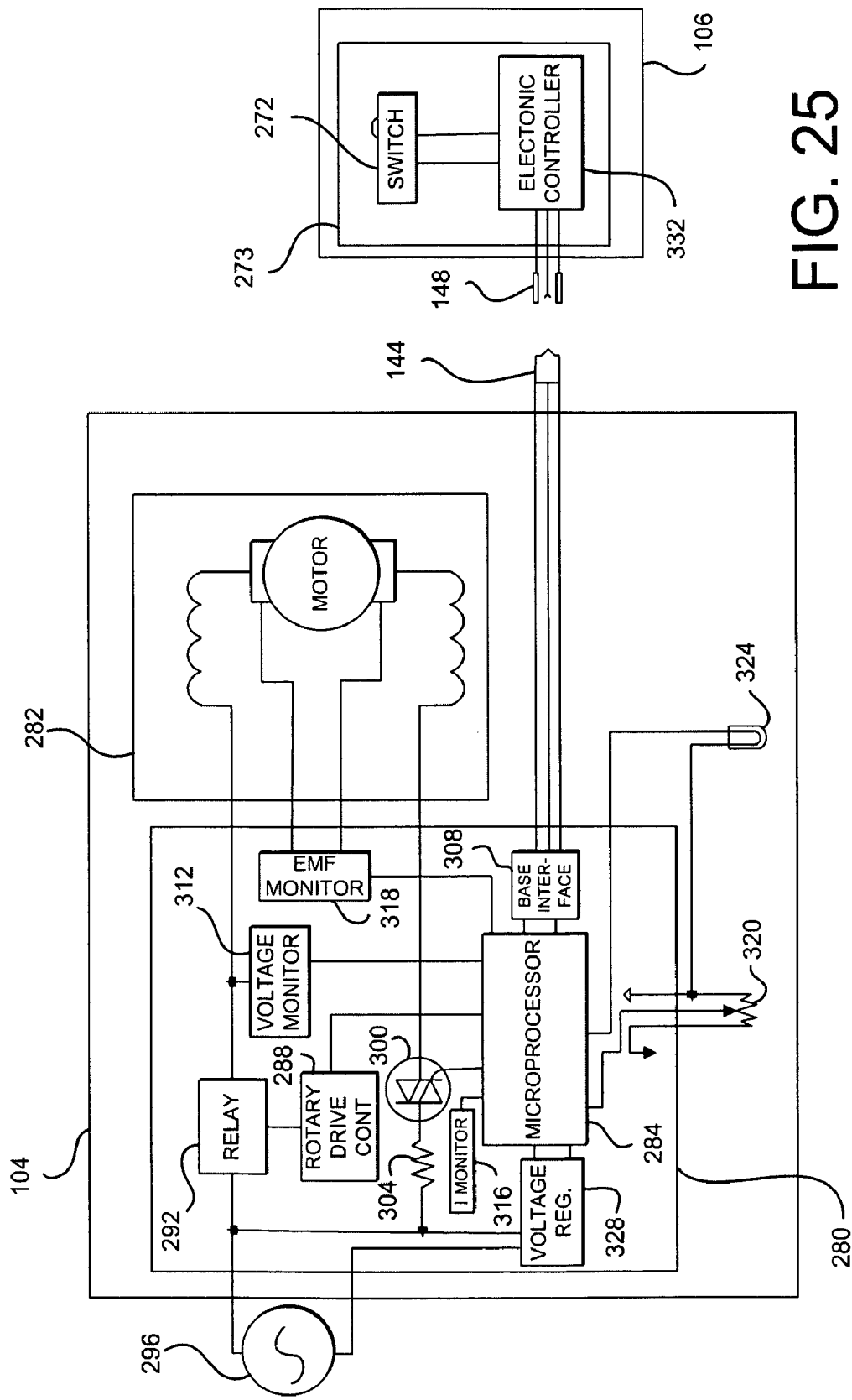
FIG. 25 illustrates a schematic view of an electronic circuit for controlling the motor unit of FIG. 3 or FIG. 4.

FIG. 25 illustrates the electrical components of the combination router 100, in schematic form, including a control circuit 280 for controlling when the motor 282 becomes energized. In particular, the motor unit 104 includes a microprocessor 284 connected to rotary drive controller 288, which selectively opens and closes relay 292. When in the closed position, relay 292 connects a source of alternating current 296 to a first stator connection upon the motor 282. A second stator connection of the motor 282 is connected to a first terminal of a bidirectional triode thyristor, commonly referred to as a triac 300. A second terminal of the triac 300 is connected to a current sensing resistor 304, which is also connected to the source of alternating current 296. The gate of triac 300 is connected to the microprocessor 284. Electrical connector 144 is coupled to a base interface circuit 308, which is connected to the microprocessor 284. A voltage monitor 312 is connected to the first stator terminal of the motor 282 and the microprocessor 284. Likewise, a current sensing unit 316 is connected to the second terminal of the triac 300 and the microprocessor 284. An electromotive force ("EMF") monitor 318, configured to monitor the back electromotive force generated by the motor 282, is connected to both stator terminals of the motor 282 as well as the microprocessor 284. A variable resistor 320, provided as a potentiometer, is also connected to the microprocessor 284. A plurality of enunciators, provided as light emitting diodes ("LED") 324 are connected to the microprocessor 284. The microprocessor 284 is powered by a voltage regulator 328 connected to the source of alternating current 296. Electrical connector 148 is electrically coupled to an electronic controller 332 in the base unit 106. Switch 272 is also electrically coupled to the electronic controller 332.

Figure 26:
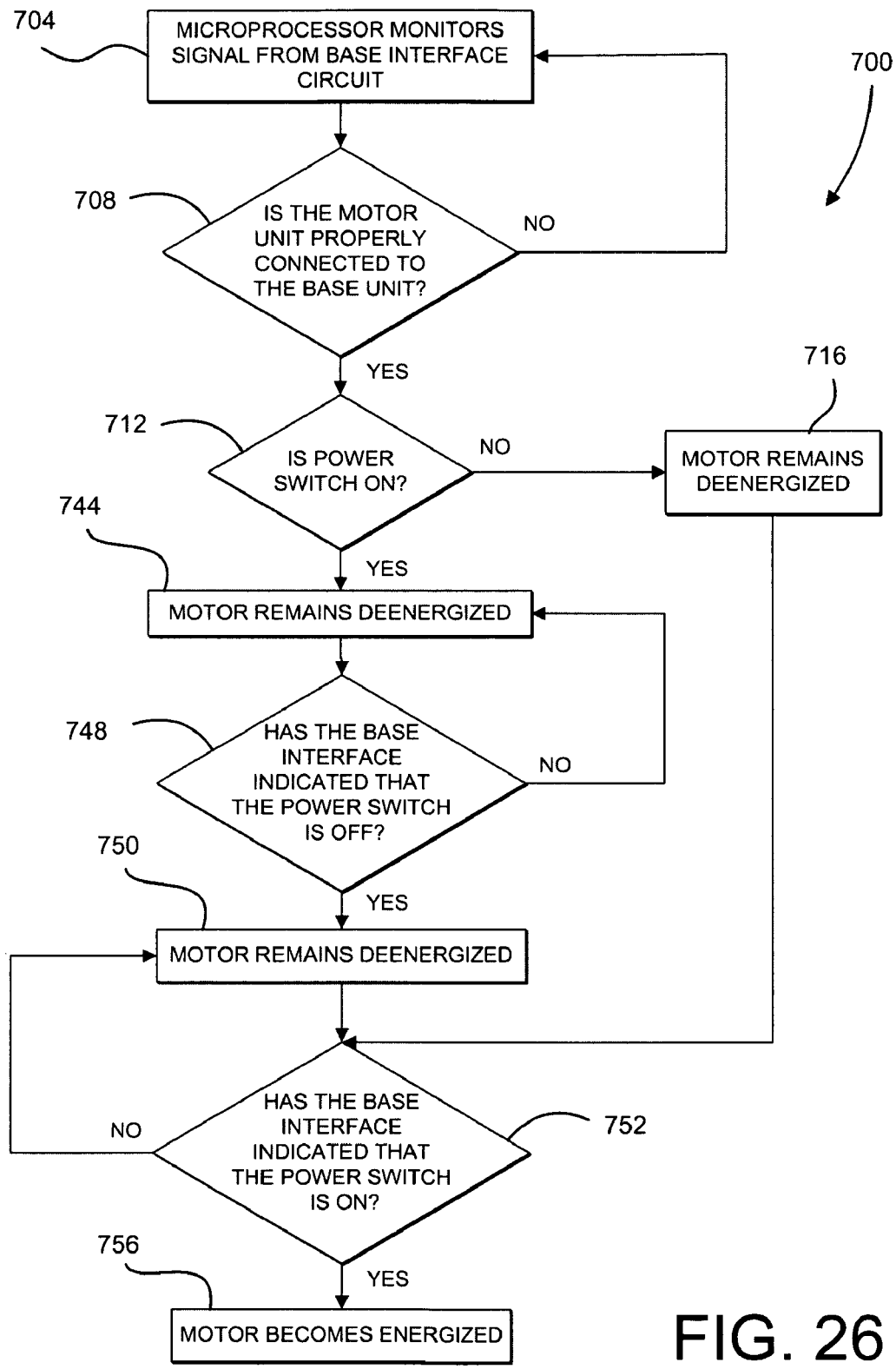
FIG. 26 illustrates a flowchart depicting an exemplary method for controlling a combination router.
Figure 29:
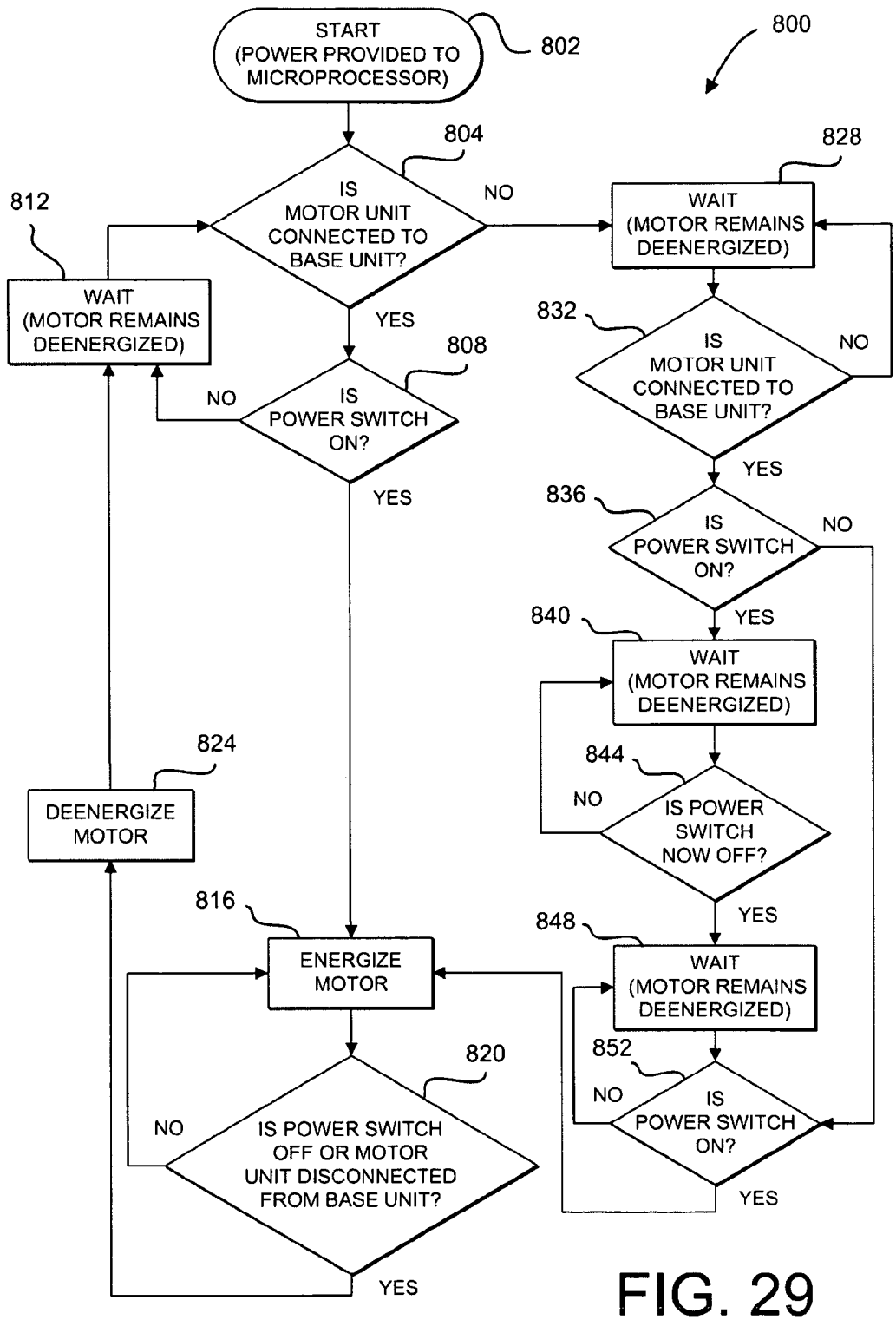
FIG. 29 illustrates a flowchart depicting an alternative exemplary method for controlling a combination router.

The electronic components of FIG. 25 implement a method 700 of controlling the router 100, illustrated by the flowchart of FIG. 26. As shown in step 704 of FIG. 26, once the motor unit 104 is connected to a source of power, the microprocessor 284 begins to monitor the base interface circuit 308 to determine if the motor unit 104 is properly connected to a base unit 106. In particular, the microprocessor 284 and the base interface circuit 308 act as a sensor to determine if the base unit 106 is properly connected to the motor unit 104 and also to determine if the switch 272 is in an on or off position. Note that the sensor may be provided in other embodiments as a magnetic sensor, an optical sensor, or other sensors as will be recognized the those of skill in the art. Additionally, note that in the embodiment of FIG. 26, the microprocessor 284 functions similarly if motor unit 104 is connected to a source of power before or after being properly connected to the base unit 106. However, as shown in the embodiment of FIG. 29, the motor unit 104 may be configured to operate differently depending on if motor unit 104 is connected to a source of power before or after being properly connected to the base unit 106.

Next, as shown in step 708, if the microprocessor 284 determines that motor unit 104 is not properly connected to a base unit 106 the router 100 cannot be utilized, as power is not delivered to the electric motor 282. Instead, the microprocessor 284 continues to monitor the base interface circuit 308 without regard for the position of the power switch 272. Specifically, a user may plug the power cord 132 of the motor unit 104 into an electrical power outlet and locate the power switch 272 in the on position, but if the motor unit 104 is not properly connected to the base unit 106, the motor 282 does not become energized. Note that a proper connection of the motor unit 104 to a base unit 106 includes a mechanical connection of electrical connector 144 to electrical connector 148.

The microprocessor 284 recognizes that the motor unit 104 is properly connected to the base unit 106 after the base interface circuit 308 determines that the electronic controller 332 has generated a predetermined voltage level or levels at connector 148. In particular, when the motor unit 104 is connected to the base unit 106, the base interface circuit 308 may be configured to send an electronic signal across connectors 144, 148 to the electronic controller 332. The signal causes electronic controller 332 to generate an output consisting of one or more predetermined voltage levels. For instance, the signal may cause the electronic controller 332 to generate a "high" voltage level across conductors one and two of connector 148 and a "low" voltage level across conductors two and three of connector 148. After sending the signal to the electronic controller 332, the base interface circuit 308 monitors the voltage levels on connector 144. Only when the base interface circuit 308 detects the predetermined voltage levels at connector 144 does the base interface circuit 308 indicate to the microprocessor 284 that the motor unit 104 is properly secured to a base unit 106. The base interface circuit 308 may be configured to detect any combination of high and low voltages or high and low currents upon the conductors of connector 144. Furthermore, the electronic controller 332 and base interface circuit 308 may be configured to function with electrical connectors 144, 148 having any number of contacts. Because the base interface circuit 308 permits the microprocessor 284 to energize the motor 282 only when the predetermined voltage levels have been detected, the base interface circuit 308 prevents a user from connecting a jumper wire across the contacts of connector 144 in an attempt to energize the motor unit 104 when the motor unit 104 is not properly connected to a base unit 106.

As shown in step 712, once the microprocessor 284 detects that the motor unit 104 has become properly connected to a base unit 106 (such that an electrical connection is established between the motor unit 104 and the base unit 106), the microprocessor 284 attempts to detect the position of the power switch 272. Note that when the motor unit 104 is properly inserted in the base unit 106, electrical connector 144 mates with complementary electrical connector 148, such that an electrical connection is established between the motor unit 104 and the base unit 106. This electrical connection enables the microprocessor 284 to monitor the output of the electronic controller 332 in the base unit 106, which provides a signal that indicates if the switch 272 is on or off. As previously mentioned, this monitoring of whether the switch 272 is on or off may occur either before or after the motor unit 104 is properly connected to a base unit 106. Accordingly, the microprocessor 284 determines whether the switch 272 is on or off at an initial connection time, the initial connection time being a moment when the motor unit 104 is supplied with electrical power and is properly connected to a base unit 106.

As shown in steps 716 and 752, if the microprocessor 284 determines that the switch 272 is in the off position the motor 282 remains deenergized until the microprocessor 284 detects that the switch 272 has switch to the on position. Next, as shown in step 756, once the switch 272 enters the on position, the microprocessor 284 energizes the motor 282. In particular, the microprocessor 284 instructs the rotary drive controller 288 to close the contacts of relay 292. The microprocessor 284 also varies timing of the triac 300 gate signal to increase the rotational speed of the motor 282 slowly to an operating speed as determined by the variable resistor 320.

As shown in step 744, however, if after determining that the motor unit 104 is properly connected to the base unit 106, the microprocessor 284 determines that the power switch 272 is in the on position, the motor 282 remains deenergized. Thus, even though the switch 272 is in a position that normally causes the motor 282 to become energized, the microprocessor 284 prevents the motor 282 from becoming energized, by maintaining the relay 292 in an open configuration and grounding the gate signal of the triac 300. Thus, in the embodiment of FIG. 26, it will be noted that the motor 282 does not become immediately energized upon the microprocessor 284 determining that the motor unit 104 is properly seated in a base unit 106. Next, as shown in step 748, the microprocessor 284 monitors the base interface circuit 308 to determine if the switch 272 has switched to the off position. As shown in step 750 the motor 282 remains deenergized while the switch 272 is off. Once, the microprocessor 284 detects that switch 272 has switched to the off position the microprocessor 284 is configured to energize the motor 282 as soon as the switch 272 enters the on position, as shown in steps 752 and 756.

Figure 27:
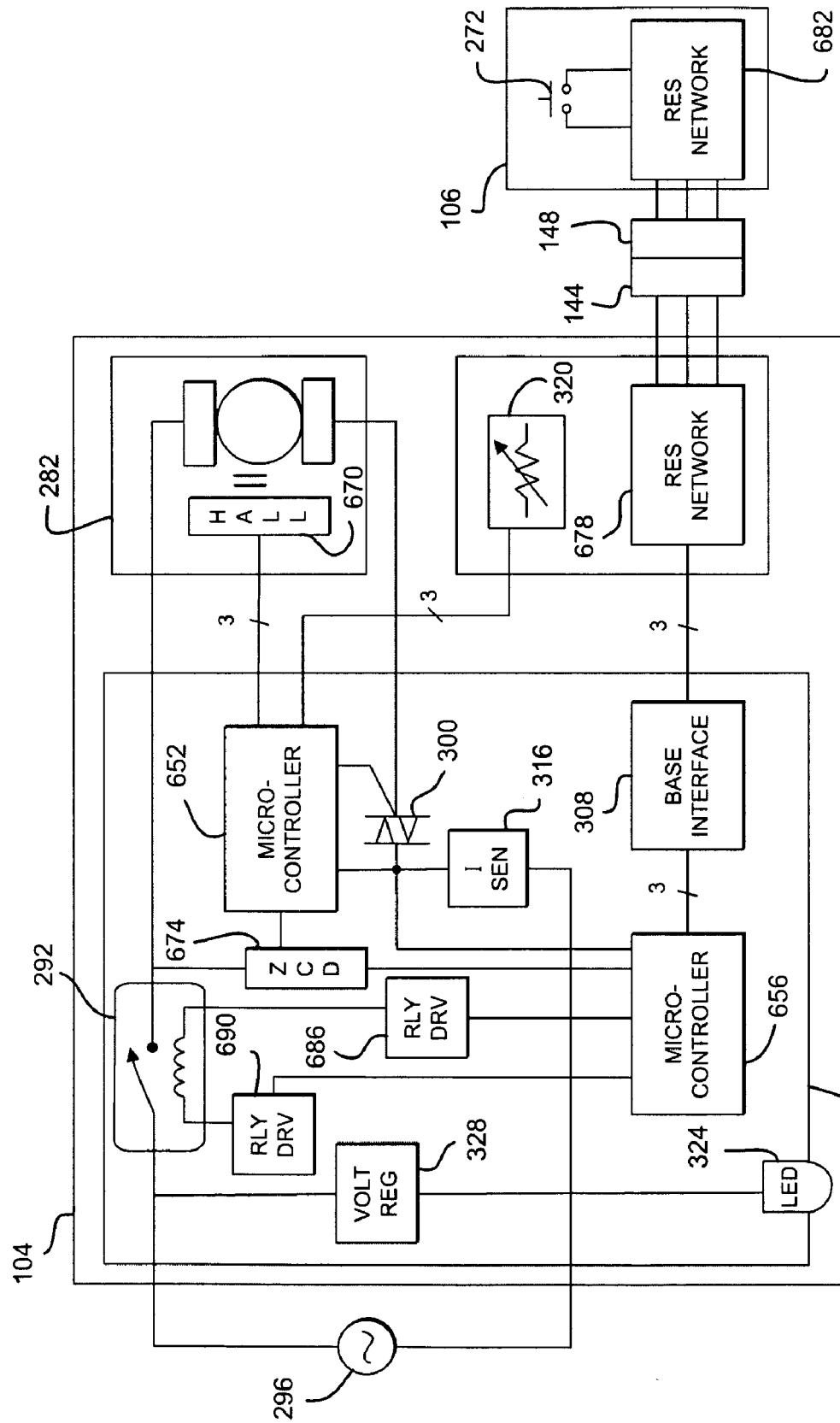
FIG. 27 illustrates a schematic view of an alternative embodiment of an electronic circuit for controlling the motor unit of FIG. 3 or FIG. 4.

Referring now to FIG. 27, a schematic illustrates an alternative embodiment of the electronic components of the combination router 100. Identical components in FIG. 25 and FIG. 27 are identified with the same reference numerals. Notably, the schematic of FIG. 27 includes a first microprocessor 652 and a second microprocessor 656. Each microprocessor 652, 656 may be programmed to control and monitor different elements and components within the router 100. For example, the first microprocessor 652 may be programmed to control the operation of the electric motor 282, and the second microprocessor 656 may be programmed to detect electrical faults.

The schematic of FIG. 27 includes a series of resistor networks 678, 682 utilized by microprocessor 656 to determine when the motor unit 104 is properly connected to a base unit 106. In particular, the base interface circuit 308 is connected to a first resistor network 678, which is connected to electrical connector 144. Electrical connector 148 is connected to a second resistor network 682, which is connected to switch 272. The first resistor network 678 becomes electrically coupled to the second resistor network 682 when the motor unit 104 is connected to a base unit 106. The resistor networks 678, 682 generate a particular voltage level or levels in response to the position of the switch 272. Specifically, when the motor unit 104 is connected to a source of power 296, the base interface circuit 308 sends an electronic signal to the first resistor network 678. When the motor unit 104 is connected to a base unit 106, this signal is electrically coupled to the second resistor network 682 through connectors 144 and 148. When switch 272 is in the closed position the signal causes the second resistor network 682 to generate a predetermined set of voltage levels on the conductors provided in the electrical connectors 144 and 148. Only when the base interface circuit 308 detects that the predetermined set of voltage levels has been generated does the microprocessor 656 energize the motor 282.

Fault Protection Circuitry

The circuits of FIG. 25 and FIG. 27 implement a method of fault protection utilized by the router 100. Under normal operating conditions the motor 282 operates as described above; however, like all electronic devices there exists a potential that one or more of the electric components within the router 100 could fail. The circuits of FIG. 25 and FIG. 27 ensure that if one of the components controlling the supply of power to the motor 282 should fail, that the router 100 does not enter a state in which the motor 282 cannot become deenergized by releasing switch 272.

The fault protection circuits of FIG. 25 and FIG. 27 function by monitoring the current and voltage drawn by the motor 282. Specifically, relay 292 and triac 300 are in series with the stator of the motor 282, thus by monitoring the state of these devices the microprocessor 284 may detect if a fault has occurred. If the triac 300 or the relay 292 fails in an open state, the motor 282 cannot become energized, because a complete electric circuit cannot be formed. The current sensing unit 316 may detect this fault as an unexpectedly low current level at a time in which the microprocessor 284 has attempted to energize the motor 282. In response to the fault, the microprocessor 284 may energize an LED 324 to alert the user that the router 100 has experienced an electronic fault.

If the relay 292 fails in the shorted or "closed" state the motor 282 may still be operational. Thus, to deenergize the motor 282 the microprocessor 284 may deenergize the triac 300 gate signal, which makes the triac 300 behave as an open circuit, thereby halting the flow of current to the motor 282. The voltage monitor 312 of FIG. 25, provided as a zero crossing detector 674 in FIG. 27, may detect that relay 292 has faulted in the shorted state, by the presence of a voltage level, namely the alternating current supply 296, at time after the microprocessor 284 has signaled to open the relay 292. Note that the router 100 functions normally when the relay 292 fails in the shorted state; nonetheless, after detecting the fault, the microprocessor 284 may energize an LED 324 or prevent the motor 282 from becoming energized to alert a user that the router 100 has experienced an electronic fault and should be serviced.

The circuit of FIG. 27 includes a pair of relay drivers 686, 690 in series with the control circuit of the relay 292. The relay drivers 686, 690 transfer an output signal of microprocessor 656 into a signal suitable to energize the relay 292. In particular, to close the contacts in the relay 292 microprocessor 656 sends a signal to both relay driver 686, 690 indicating that the control circuit of the relay 292 should be energized, thereby closing the contact in the relay 292 and energizing the motor 282. Having two relay drivers 686, 690 implements a redundant system that ensures the motor 282 can be deenergized if one of the relay drivers 686, 690 where to fail in the shorted state. In particular, if relay driver 686 were to fail in the shorted state microprocessor 656 could deenergize the motor 282 by signaling to relay driver 690 that the motor 282 should be deenergized.

If the triac 300 fails in the shorted state the motor 282 may still be energized and deenergized by opening and closing relay 292. The microprocessor 284 may detect when triac 300 has failed in the shorted state by monitoring the current sensing module 316. Specifically, a larger than anticipated current should flow through the current sensing resistor 304 when triac 300 fails in the shorted state. Note that if the triac 300 fails in the shorted state, the router 100 looses the ability to increase the rotational speed of the motor 282 slowly to the user desired rotational speed as determined by the position of the variable resistor 320. In at least one embodiment, in response to the detected fault, the microprocessor 284 may be configured to energize an LED 324 or prevent the motor 282 from becoming energized, thereby signaling that the router 100 should be serviced.

Motor Speed Control Circuitry

Referring again to the circuit of FIG. 25, note that the microprocessor 284 utilizes the rotary drive unit 288 and the triac 300 to maintain a constant motor 282 rotational speed. The router 100 is configured to maintain a constant rotational speed even when the rotating cutting bit encounters the physical resistance of a workpiece. As mentioned above, the desired speed is set by the position of variable resistor 320. The microprocessor 284 generates a signal level that when applied to the triac 300 permits a level of current to flow through the motor 282 to bring the motor 282 to the desired speed. However, when the cutting bit encounters the resistance of a workpiece, the motor 282 experiences an increased load and if the same level of current is supplied, the motor 282 rotates at a slower speed. Thus, the microprocessor 284 utilizes the EMF monitor 282 to determine the level of back electromotive force generated by the motor 282, which is representative of the current speed of the motor 282. The microprocessor 284 then adjusts the triac 300 gate signal to ensure the desired motor 282 speed is maintained even when the motor 282 is under load. In the embodiment illustrated in FIG. 27, microprocessor 652 utilizes the Hall Effect sensor 670 to monitor the rotational speed of the motor.

Alternative Embodiments for Table Router Configuration

In another embodiment, the standard base 112 includes circuitry enabling the router 100 to become energized and deenergized when connected to a router table having a table switch. The circuitry includes a router table detection switch (not illustrated) secured to the base unit 112 and movable from an "off" position, indicating the router base 112 is not connected to a router table, to an "on" position, indicating the router base 112 is connected to a router table. The detection switch is electrically connected to the electronic controller 332. The detection switch may include an actuator, such as toggle, that may be manually positioned by a user. Alternatively, the detection switch may include an actuator configured to engage a post on the router table. In particular, the detection switch may be biased in the off position; however, when the standard base 112 is properly assembled in a router table, the post may contact the actuator, thereby locating the detection switch in the on position.

Figure 28:
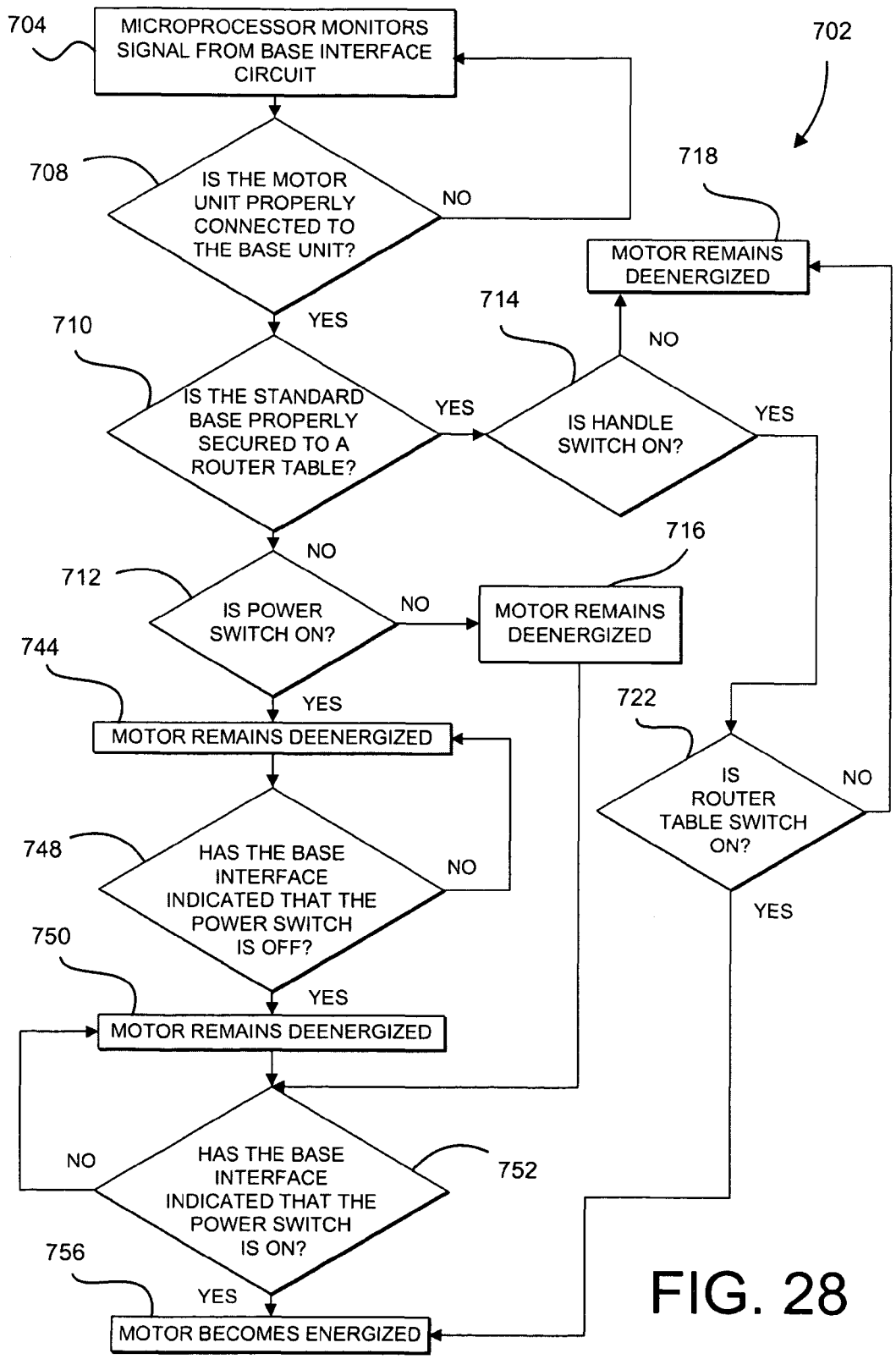
FIG. 28 illustrates a flowchart depicting an alternative exemplary method for controlling a combination router.

The router 100 having a router table detection switch operates according to method 702, illustrated by the flowchart of FIG. 28. Method 702, illustrated in FIG. 28, contains some steps that are identical to the steps of method 700, illustrated in FIG. 26. The blocks which represent the same steps in both methods 700, 702 are identified with the same reference numerals. As shown in step 710, after the microprocessor 284 determines that the motor 282 is properly seated on the base unit 112, the microprocessor 284 determines if the detection switch is in the on or off position, which indicates if the router base 112 is properly connected to a router table. If the detection switch in is the off position the router 100 functions as described above with reference to the flowchart of FIG. 26. If, however, as shown in step 714, the detection switch is in the on position, the microprocessor 284 determines if the power switch 272 on the handle 160, 164 of the router 100 is in the on or off position. As shown in step 718, if the handle switch 272 is in the off position the motor 282 may not become energized. As shown in step 722, however, if the handle switch 272 is in the on position the microprocessor 284 permits the router table switch to control the power state of the motor 282. For example, as shown in step 718 if the router table switch is in the off position the motor does not become energized. Alternatively, as shown in step 756, if the router table switch is in the on position the motor becomes energized even though the handle switch 272 has not been positioned in the off position as required by step 748 when the router base 112 is not connected to a router table.

Alternative Embodiment with Initial Power Detection

In another embodiment the router may be configured to operate differently depending on whether the motor unit is (i) already connected to the base unit when the power cord is plugged into a power outlet or (ii) subsequently connected to the base unit after the power cord is plugged into a power outlet. An example of such a method 800 of operating the routing machine is illustrated in the flowchart of FIG. 29. As provided in step 802 of FIG. 29, the method 800 begins when the microprocessor is supplied with power, which of course can be accomplished by plugging the motor unit into a wall outlet. Next, as provided in step 804, when the microprocessor determines if the motor unit is connected to a base unit. As shown in step 808, if the motor unit is connected to a base unit the microprocessor next determines if the power switch is in the on position. As provided in step 812, if the power switch is not in the on position the motor remains deenergized and the microprocessor continues to monitor the position of the power switch as shown in step 808. As shown in step 816, when the power switch is switched to the on position the motor becomes energized. Step 820 provides that when the power switch is subsequently switched to the off position that the motor becomes deenergized as provided in step 824.

Referring step 828 of the method 800 illustrated by the flowchart FIG. 29, if after supplying the microprocessor with power the motor unit is not connected to a base unit the motor remains deenergized. Next, as provided in step 832, the processor again determines if the motor unit is connected to a base unit. If the motor unit is not connected to a base unit the motor remains deenergized as shown in step 832. However, as shown in step 836 if the motor unit is connected to a base unit the microprocessor next determines if the power switch is in the on position. As shown in step 840, even if the power switch is in the on position the motor remains deenergized. Next, as provided in step 844, the microprocessor monitors the position of the power switch. If the switch remains in the on position the motor remains deenergized as shown in step 840. However, as shown in step 848 if the switch is switched to the off position the motor remains deenergized, but becomes energized the next time the switch is switched to the on position as shown in step 816. As provided in step 820, the motor remains energized until the power switch enters the off position or the motor unit is disconnected from the base unit.

Although a power tool has been described with respect to certain preferred embodiments, it will be appreciated by those of skill in the art that other implementations and adaptations are possible. For example, although the power switch 272 has been described as being located on a handle 160, 164 of the base unit 106, the power switch 272 may instead be located on the motor unit 104. Likewise, the router 100 may include a power switch 272 on both the motor unit 104 and a handle 160, 164. Moreover, there are advantages to individual advancements described herein that may be obtained without incorporating other aspects described above. Therefore, the spirit and scope of the appended claims should not be limited to the description of the preferred embodiments contained herein, and the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants, patentees, and others.

What is claimed is:

1. A power tool comprising:
    a base unit including (i) a receptacle structure defining an interior space configured to receive a motor unit therein, (ii) a handle fixed in relation to the receptacle structure and spaced apart from the interior space, and (iii) a first electrical connector attached to the receptacle structure so as to be located within the interior space;
    a motor unit including a motor housing having an exterior surface, an electric motor located within the motor housing, and a second electrical connector secured to the motor housing, wherein the motor unit is positionable between (i) a first position in which the motor housing is located in the interior space so that the first electrical connector is positioned in contact with the second electrical connector, and (ii) a second position in which the motor housing is spaced apart from the interior space so that the first electrical connector is spaced apart from the second electrical connector; and
    a switch supported by the base unit, wherein electric power is delivered to the electric motor when the switch is in an on position and wherein electric power is prevented from being delivered to the electric motor when the switch is in an off position.

2. The power tool of claim 1 wherein an electrical power cord configured for connection to an electrical wall outlet is connected to the motor unit.

3. The power tool of claim 1 wherein the switch comprises an electrical switch actuated by a trigger positioned on the handle of the base unit.

4. The power tool of claim 3 further comprising a trigger lock positioned on the handle, the trigger lock configured to lock the switch in the on position.

5. The power tool of claim 1 further comprising a control circuit configured to (i) determine if the switch is in the on position or the off position when the motor unit is initially connected to the base unit, and (ii) prevent delivery of electrical power to the electric motor if the switch is in the on position when the motor unit is initially connected to the base unit.

6. The power tool of claim 5 wherein the control circuit is further configured to provide electrical power to the electric motor once the switch is moved to the off position and then back to the on position after the control circuit detects that the switch is in the on position when the motor unit is initially connected to the base unit.

7. The power tool of claim 1 wherein the base unit is a plunge base such that the power tool operates as a plunge base router.

8. The power tool of claim 1 wherein the base unit is a fixed base such that the power tool operates as a fixed base router.

9. The power tool of claim 8 wherein the fixed base is secured to a router table.

10. A routing machine comprising:
    a base unit including (i) a receptacle structure defining an interior space, (ii) a handle fixed in relation to the receptacle structure and spaced apart from the interior space, and (iii) a first electrical connector attached to the receptacle structure so as to be located within the interior space;
    a motor unit including a motor housing having an exterior surface, an electric motor located within the motor housing, and a second electrical connector secured to the motor housing, wherein the motor unit is positionable between (i) a first position in which the motor housing is located in the interior space so that the first electrical connector is positioned in contact with the second electrical connector, and (ii) a second position in which the motor housing is spaced apart from the interior space so that the first electrical connector is spaced apart from the second electrical connector;
    a power circuit configured to deliver electrical power to the electric motor;
    a switch supported by the base unit, the switch movable between an on position and an off position, wherein electric power is delivered to the electric motor when the switch is in the on position and wherein electric power is prevented from being delivered to the electric motor when the switch is in the off position; and a motor control circuit configured to control the power circuit, the motor control circuit configured to determine whether the switch is in the on position when the motor unit is positioned in the first position and open the power circuit if the switch is in the on position.

11. The routing machine of claim 10 wherein an electrical power cord configured for connection to an electrical wall outlet is connected to the motor unit.

12. The routing machine of claim 10 wherein the switch is supported by the handle of the base unit.

13. The routing machine of claim 12 further comprising a lock supported by the handle and configured to lock the switch in the on position.

14. The routing machine of claim 10 wherein the motor control circuit is further configured to provide electrical power to the electric motor once the switch is moved to the off position and then back to the on position after the motor control circuit detects that the switch is in the on position when the motor unit is initially connected to the base unit.

15. The routing machine of claim 10 wherein the base unit is a plunge base.

16. The routing machine of claim 10 wherein:

the base unit is a first base unit and the routing machine also comprises a second base unit, the second base unit includes (i) an additional receptacle structure defining an additional interior space configured to receive the motor unit therein, (ii) an additional handle fixed in relation to the additional receptacle structure and spaced apart from the additional interior space, and (iii) a third electrical connector attached to the additional receptacle structure so as to be located within the additional interior space, the motor unit is also positionable in a third position in which the motor housing is located in the additional interior space so that the third electrical connector is positioned in contact with the second electrical connector, and the first base unit is a plunge base and the second base unit is a fixed base.

17. The power tool of claim 1, wherein the motor housing is supported by the receptacle structure when the motor unit is positioned in the first position.

18. The power tool of claim 1, wherein the second electrical connector is secured to the exterior surface of the motor housing.

19. The routing machine of claim 10, wherein the motor housing is supported by the receptacle structure when the motor unit is positioned in the first position.

20. The routing machine of claim 10, wherein the second electrical connector is secured to the exterior surface of the motor housing.

* * * * *